US008955156B2

(12) United States Patent
Forrest

(10) Patent No.: US 8,955,156 B2
(45) Date of Patent: Feb. 10, 2015

(54) METHOD AND APPARATUS FOR SECURELY PROVIDING POSTAL ADDRESS DATA TO CLIENT DEVICES

(71) Applicant: Addresstrek Limited, Bridport, Dorset (GB)

(72) Inventor: Charles Forrest, Bridport (GB)

(73) Assignee: Addresstrek Limited, London (GB)

( * ) Notice: Subject to any disclaimer, the term of this patent is extended or adjusted under 35 U.S.C. 154(b) by 113 days.

(21) Appl. No.: 13/859,017

(22) Filed: Apr. 9, 2013

(65) Prior Publication Data

US 2014/0259188 A1 Sep. 11, 2014

(30) Foreign Application Priority Data

Mar. 7, 2013 (GB) .................................. 1304178.5

(51) Int. Cl.
*G06F 7/04* (2006.01)
*H04L 29/06* (2006.01)
(52) U.S. Cl.
CPC ..................................... *H04L 63/04* (2013.01)
USPC .......................................... 726/29; 713/159
(58) Field of Classification Search
None
See application file for complete search history.

(56) References Cited

U.S. PATENT DOCUMENTS

| 5,721,780 | A  | * | 2/1998  | Ensor et al. ................... 713/155 |
|-----------|----|---|---------|---------------------------------|
| 7,003,133 | B2 | * | 2/2006  | Lhomme ......................... 382/101 |
| 7,971,069 | B2 | * | 6/2011  | Yellepeddy .................... 713/189 |
| 8,024,290 | B2 | * | 9/2011  | Yang et al. ..................... 707/625 |
| 8,732,475 | B2 | * | 5/2014  | Fahrny et al. ................. 713/176 |
| 2002/0052971 | A1 | * | 5/2002  | Okudera ........................ 709/245 |
| 2008/0313457 | A1 | * | 12/2008 | Ilechko .......................... 713/159 |
| 2010/0094758 | A1 | * | 4/2010  | Chamberlain et al. .......... 705/50 |
| 2013/0041909 | A1 | * | 2/2013  | Coleman et al. .............. 707/758 |
| 2013/0312065 | A1 | * | 11/2013 | Abeyweera ....................... 726/3 |
| 2014/0223582 | A1 | * | 8/2014  | Robert ............................ 726/29 |

FOREIGN PATENT DOCUMENTS

| EP | 0862104 A2 | 9/1998 |
| EP | 1059793 A2 | 12/2000 |

OTHER PUBLICATIONS

Search Report for corresponding UK patent application No. GB1304178.5 issued on Sep. 10, 2014.

* cited by examiner

*Primary Examiner* — Fikremariam A Yalew
(74) *Attorney, Agent, or Firm* — Heslin Rothenberg Farley & Mesiti P.C.; Victor A. Cardona

(57) ABSTRACT

A method of securely providing postal address data to a requesting client device includes storing, at a server, a plurality of number items each associated with at least one respective address item. Each number item is indicative of a mobile telephone number and each address item is indicative of postal address data. A requesting client device sends an address item request, to the server, and the address item request includes a target key indicative of a mobile telephone number. The address item request is received at the server. A respective address item associated with a number item indicative of the mobile telephone number indicated by the target key is identified at the server. A data package including at least a part of the postal address data indicated by the respective address item identified at the server is sent from the server to the requesting client device.

17 Claims, 10 Drawing Sheets

METHOD AND APPARATUS FOR SECURELY PROVIDING POSTAL ADDRESS DATA TO CLIENT DEVICES

CROSS REFERENCE TO RELATED APPLICATIONS

This application claims priority from United Kingdom Patent Application No. 1304178.5 filed on Mar. 7, 2013, the entire disclosure of which is incorporated herein by reference.

BACKGROUND OF THE INVENTION

The present invention relates to methods and apparatus for securely providing postal address data to client devices.

It is usually desirable for a person's postal address to be accessible by their friends, family, business contacts etc. However, in the interest of security it is desirable that a person's name and postal address is not accessible in the public domain.

Conventionally, for a person to access somebody else's postal address they must specifically request it. The advantage of transferring information in this way is that the other person has ultimate control as to whom he sends his/her postal address data. However, a disadvantage of this method is that the other person will have to respond to each individual request for access to his/her postal address data.

SUMMARY OF THE INVENTION

In order to avoid having to respond to each request for postal address data individually, a person may upload this data onto an internet page in the public domain. The advantage of this method is that the postal address is now easily accessible to a person's friends, family, business contacts etc. by accessing the internet page. However, this is not a secure method because anybody with an internet connection is then able to access the person's postal address in association with his/her name.

A more secure alternative to this method may be for a person to upload his/her postal address data onto a page that is only accessible by certain people. This, for example, may be a page on a social networking site that is only accessible by that person's social networking connections. The advantage of this method is that a person can select whom he/she shares postal address data with. A disadvantage to this method is that a person's postal address data is stored at a server in connection with that person's name. In this situation if the data were to be accessed by an unauthorised third party then the data would reveal the identity of the person along with, for example, their home or work address. This is undesirable because this may leave that person exposed to identity theft.

It would be desirable to provide techniques for securely providing access to postal address data.

According to a first aspect of the present invention there is provided a method of securely providing postal address data to a client device comprising the steps of:
(a) storing, at a server, a plurality of number items each associated with at least one respective address item, wherein each number item is indicative of a mobile telephone number and each address item is indicative of postal address data;
(b) receiving, at the server, an address item request, from a requesting client device, the address item request including a target key indicative of a mobile telephone number;
(c) identifying, at the server, a respective address item associated with a number item indicative of the mobile telephone number indicated by the target key; and
(d) sending from the server, to the requesting client device, a data package including at least a part of the postal address data indicated by the respective address item identified at the server.

With such a method the server can provide postal address data to a client device based on the receipt of a request indicating mobile telephone number data. Therefore, only postal address data and corresponding mobile telephone number data are required to be stored at the server.

By using mobile telephone number data to identify postal addresses there is no need for the server to store any other personal information, such as personal names, in association with each address item. This results in a more secure system due to the fact that the data stored at the server remains anonymous.

Preferably, the address item request also includes an access key indicative of another mobile telephone number.

Preferably, the mobile telephone number indicated by the access key corresponds to the requesting client device.

With such a method the server can determine the origin of an address item request.

It may be desirable to control the distribution of postal address data by only allowing the server to send postal address data to a client device corresponding to a mobile telephone number that is authorised to receive specific postal address information.

Preferably, the method comprises the further step of:
storing, at the server, an indication that at least one mobile telephone number is an authorised connection of another mobile telephone number.

In this way it is possible for the server to identify client devices corresponding to mobile telephone numbers that are authorised to receive specific postal address data.

Preferably, the method comprises the further steps of:
before step (d) of the first aspect of the invention, determining at the server whether mobile telephone number indicated by the access key is an authorised connection of the mobile telephone number indicated by the target key; and,
carrying out step (d) of the first aspect of the invention, only if the mobile telephone number indicated by the access key is an authorised connection of the mobile telephone number indicated by the target key.

In this way, a mobile telephone number can be used as an access key for obtaining postal address information. The mobile telephone number used as the key will usually be linked with a specific user. Therefore, a particular postal address data item may only be provided in response to a postal address data item request from a specific user's client device.

Preferably, each of the plurality of number items is associated with an authorised connection list indicative of at least one other mobile telephone number, wherein a mobile telephone number indicated by an authorised connection list is an authorised connection of the mobile telephone number indicated by the number item associated with the authorised connection list.

By associating each number item with an authorised connection list it is possible for the server to store a record of the access keys that may be used in order access to the postal address information associated with each number item.

Preferably, each of the plurality of number items is associated with a respective unique identification code and each authorised connection list is indicative of at least one unique identification code.

In this way the authorised connection lists do not specify actual mobile telephone numbers. Instead the authorised connection lists only specify unique codes associated with the number items stored at the server. This avoids a mobile telephone number being directly associated with a list of other mobile telephone numbers.

Preferably, the mobile telephone number indicated by the target key corresponds to a target client device.

Preferably, the step of determining at the server whether the mobile telephone number indicated by the access key is an authorised connection of the mobile telephone number indicated by the target key comprises the steps of
- sending from the server, to the target client device, an access request including the access key; and,
- receiving at the server, from the target client device, an authorised connection confirmation indicating that the mobile telephone number indicated by the access key is an authorised connection of the mobile telephone number indicated by the target key.

In this way, the server can interrogate the target client device to determine whether an access key is valid. This may be useful, for example, if the mobile telephone number corresponding to the requesting client device is not listed as an authorised connection of the target device at the server. Alternatively this may be required if there has been no previous connection between the two client devices corresponding to the mobile telephone numbers indicated by the address item request.

Preferably, the method comprises the further step of:
- after receiving the authorised connection confirmation, storing at the server an indication that the mobile telephone number indicated by the access key is an authorised connection of the mobile telephone number indicated by the target key.

In this way, once the target client device has confirmed that the mobile telephone number indicated by the access key is an authorised connection it will not have to confirm this information again. Hence, a client device will not be repeatedly interrogated each time an identical postal address data item request is received at the server.

Preferably, the method comprises the further step of:
- after the step of receiving the authorised connection confirmation, storing at the server an indication that the mobile telephone number indicated by the target key is an authorised connection of the number item indicated by the access key.

In this way, the mobile telephone number indicated by the target key will automatically be added as an authorised connection of the mobile telephone number corresponding to the requesting client device. In the interest of security it is assumed that a client device requesting postal address information related to another client device should be willing to share its own associated postal address information in return. Therefore, instead of the requesting client device having to send a separate data package to the server indicating that it is willing to share its own associated postal address information in return this is done automatically on receipt of the postal address data item request. This reduces the number of data packages that are required to be sent by client devices and reduces the number of data packages that are required to be processed by the server.

Preferably, after the step of determining at the server whether the mobile telephone number indicated by the access key is an authorised connection of the mobile telephone number indicated by the target key, the method comprises the further step of;
- identifying at the server whether the mobile telephone number indicated by the target key is an authorised connection of the mobile telephone number indicated by the access key; and,
- carrying out step (d) of the first aspect of the invention, only if the mobile telephone number indicated by the access key is an authorised connection of the mobile telephone number indicated by the target key and the mobile telephone number indicated by the target key is an authorised connection of the mobile telephone number indicated by the access key.

Thus, a requesting client device will only receive postal address information relating to a target client device if both client devices have agreed to share postal address information with each other. Therefore, it would not be possible for a unilateral transfer of postal address information. Hence, the reciprocity of information transfer can be guaranteed.

Preferably, each of the plurality of number items stored at the server are associated with an activity time stamp indicative of a period of time since the last connection was made between the server and a client device corresponding to a mobile telephone number indicated by a respective number item.

In this way, it is possible to determine the length of time between connections between the server and a client device corresponding to a mobile telephone number indicated by one of the plurality of number items.

Preferably, the method comprising the further steps of:
- storing, at the server, a predetermined de-activation value indicative of a period of time;
- identifying at the server a number item associated with an activity time stamp indicative of a period of time greater than the period of time indicated by the de-activation value; and,
- de-activating at the server the number item identified and other data associated with it.

In this way, it is possible to identify client devices corresponding to particular number items that have not connected with the server in an exceptionally long time. This may be indicative that a particular mobile telephone number is no longer in use. By de-activating the number item the server may be able to ignore requests related to this item. This may prevent the server from carrying out unnecessary processing.

Preferably, the method comprises the further step of:
- storing, at the server, a predetermined deletion value indicative of a period of time;
- identifying at the server a number item associated with an activity time stamp indicative of a period of time greater than the period of time indicated by the deletion value; and,
- deleting at the server the number item identified and other data associated with it.

In this way, it is possible for the server to automatically remove number items and corresponding data items if it is suspected that a particular mobile telephone number is no longer in use. This allows for the number item to be re-allocated at an appropriate time and avoids using unnecessary storage space at the server.

Preferably, the deletion value is greater than the de-activation value.

Thus, it is possible to de-activate a number item before deleting it. This may allow the server to re-activate the number item in the interim period between de-activation and deletion. This may be required if a client device corresponding to a de-activated number item connects with the server during this interim period.

Preferably, the method comprises the further steps of:
receiving at the server a hibernation request, from a client device, including a key indicative of a mobile telephone number; and
associating at the server a hibernation flag with a number item indicative of the mobile telephone number indicated by the key.

In this way, a number item can be entered into hibernation mode at the server on request from a client device.

Preferably, the hibernation request includes a parameter indicative of a hibernation value and the hibernation flag is configured, at the server, to be disassociated with its respective number item after a period of time corresponding to the hibernation value.

In this way, a number item can be entered into hibernation mode for a set period of time.

Preferably, the method comprises the further steps of;
identifying, at the server, one of the plurality of number items;
determining, at the server, whether the number item identified is associated with a hibernation flag; and if the number item identified is associated with a hibernation flag,
preventing, at the server, the number item identified and its other associated items from being de-activated or deleted.

In this way, if a number item is associated with a hibernation flag then the server will not delete or deactivate that number item. In certain circumstances a client device may not connect with the server for a long period of time but may still wish for its corresponding number item to form part of the server database. The hibernation flag prevents the server from wrongly assuming that a particular number item is no longer in use.

Preferably, the method comprises the further steps of:
identifying, at the server, a first mobile telephone number indicated as an authorised connection of a second mobile telephone number; and
identifying, at the server, whether the second mobile telephone number is indicated as an authorised connection of the first mobile telephone number.

Thus it is possible to analyse the consistency between authorised connection lists. This process may be carried out on the server database at regular intervals.

Preferably, if the first mobile telephone number is indicated as an authorised connection of the second mobile telephone number but the second mobile telephone number is not indicated as an authorised connection of the first mobile telephone number,
the method comprises the further step of:
removing the first mobile telephone number as an authorised connection of the second mobile telephone number.

In this way it is possible to ensure that postal address information will only be shared if the mobile telephone numbers indicated in an address item request are both authorised connections of one another. A client device may remove a mobile telephone number from the authorised connection list associated with the mobile telephone number corresponding to that client device. The above process ensures that the mobile telephone number corresponding to the client device will be removed from the authorised connection list of the mobile telephone number removed by the client device.

Preferably, the method comprises the further step of:
after the step of removing the first mobile telephone number as an authorised connection of the second mobile telephone number, sending a postal address information deletion request to a client device corresponding to the second mobile telephone number wherein the postal address information deletion request includes a key indicative of the first mobile telephone number.

For instance a mobile telephone number may be removed as an authorised connection of another mobile telephone number. In this situation it is possible to ensure that the postal address data associated with the other mobile telephone number is removed from the client device corresponding to the mobile telephone that has been removed as an authorised connection.

Preferably, each address item is associated with a respective update time stamp indicative of a period of time since the corresponding address item was last updated.

In this way it is possible to indicate how up to date an address item is.

Preferably, the method comprises the further step of:
identifying, at the server, an address item associated with an update time stamp indicative of a period of time greater than a predetermined value;
sending an address data confirmation request, from the server, to a client device corresponding to the mobile telephone number indicated by the number item associated with the address item identified;
and receiving, from the client device, a data package indicative of the validity of the address data associated with the address item identified.

Thus, when the server identifies that an address item may be out of date, a confirmation request is sent to the client device corresponding to the mobile telephone number associated with the address item identified. In response to the confirmation request the client device may send a data package indicating that the address item identified is accurate or alternatively different postal address data that is accurate.

The method may comprise the further step of:
receiving at the server, from a first client device, an authorised connection deletion request including a key indicative of a first mobile telephone number and a second mobile telephone number; and
in response to such a request, the further step of removing, at the server, an indication that the first mobile telephone number is an authorised connection of the second mobile telephone number.

Preferably, the method comprises the further step of:
after the step of removing the first mobile telephone number as an authorised connection of the second mobile telephone number, sending a postal address information deletion request to a client device corresponding to the second mobile telephone number wherein the postal address information deletion request includes a key indicative of the first mobile telephone number.

Preferably, the first mobile telephone number corresponds to the first client device and the second mobile telephone number corresponds to a second client device.

In this way it is possible for a first client device to remove a second client device, corresponding to a second mobile telephone number, as an authorised connection. This may prevent the second client device from obtaining postal address information related to the first client device.

The method may comprise the further steps of:
receiving at the server, from a first client device, a nudge request including a nudge key indicative of a mobile telephone number;
sending a postal address data confirmation request from the server, to a second client device corresponding to the mobile telephone number indicated by the nudge key; and receiving from the second client device a data package indicative of the validity of the postal address data associated with the mobile telephone number indicated by the nudge key.

Thus, a client device is able to request confirmation that a particular postal address data item is up to date. The postal address information is verified by the operator of the second client device to ensure its validity.

Preferably, the nudge request also includes an access key and the method comprises, before the step of sending a postal address data confirmation request from the server to a second client device corresponding to the mobile telephone number indicated by the nudge key, the further steps of:

identifying at the server whether the mobile telephone number corresponding to the first client device is indicated as an authorised connection of the mobile telephone number indicated by the nudge key; and, only if the mobile telephone number corresponding to the first client device is an authorised connection of the mobile telephone number indicated by the nudge key, carrying out the steps of:

sending a postal address data confirmation request from the server, to a second client device; and receiving from the second client device an address update request indicative of the validity of the postal address data associated with the number item indicated by the nudge key.

Thus, a nudge request from a first client device may only prompt a confirmation request to be sent to a second client device if the mobile telephone number corresponding to the first client device is an authorised connection of the second client device.

The method may comprise the further steps of:

receiving at the server a new user request, from a client device, the new user request including a new user key indicative of a mobile telephone number;

identifying at the server whether a number item indicative of the mobile telephone number indicated by the new user key is stored at the server; and, if a number item indicative of the mobile telephone number indicated by the new user key is not stored at the server:

sending from the server a text message to a client device corresponding to the mobile telephone number data indicated by the new user key;

receiving a response from the client device corresponding to the mobile telephone number indicated by the new user key; and storing, at the server, a number item indicative of the mobile telephone number indicated by the new user key.

In this way, the server is able to confirm whether the new user request is genuine.

Preferably, each of the plurality of number items is associated with a free text data item indicative of supplementary information.

In this way a mobile telephone number data item can be associated with a postal address and supplementary information.

Preferably, step (d) of the first aspect of the invention comprises the further step of:

sending from the server, to the requesting client device, a free text data package including at least a part of the supplementary information indicated by the free text data item associated with the number item indicative of the mobile telephone number indicated by the target key.

According to second aspect of the invention there is provided a computer program comprising code portions which when loaded and run on a computer cause the computer to execute any one of the methods defined above.

According to a third aspect of the present invention there is provided a server arranged under the control of software to comprise:

(a) a storage module arranged to store, at the server, a plurality of number items each associated with at least one respective address item, wherein each number item is indicative of a mobile telephone number and each address item is indicative of postal address data;

(b) a reception module arranged to receive, at the server, an address item request from a requesting client device the address item request including a target key indicative of a mobile telephone number;

(c) an identification module arranged to identify, at the server, a respective address item associated with a number item indicative of the mobile telephone number indicated by the target key; and (d) a transmission module arranged to send from the server, to the requesting client device, a data package including at least a part of the postal address data indicated by the respective address item identified at the server.

According to a fourth aspect of the present invention there is provided a method of securely providing postal address data to a client device comprising the steps of:

(a) storing at a requesting client device at least one number item, wherein the number item is indicative of a mobile telephone number;

(b) sending from the requesting client device an address item request to a server, the address item request including a target key indicative of the mobile telephone number indicated by a number item stored at the requesting client device; and (c) receiving at the requesting client device a data package, from the server, including postal address data.

Thus, the client device can receive postal address data from a server based on the transmission of mobile telephone number data. Therefore, only mobile telephone number data is required to be sent across a network. There is no requirement to send other personal information.

Preferably, the method comprises the further step of:

storing, at the requesting client device, a respective identification tag associated with each number item; and, associating, at the requesting client device, postal address data included in the data package with the identification tag associated with the number item indicative of the mobile telephone number indicated by the target key.

In this way the postal address information received from the server can be stored automatically in association with an identification tag. The identification tag corresponds with the tag used to identify the corresponding mobile telephone number stored at the client device.

Preferably, the address item request also includes an access key indicative of another mobile telephone number.

In this way another mobile telephone number is used as an access key for obtaining the postal address data. This enables the server to check the access key and will provide the client device with the postal address data required if the access key is valid.

Preferably, the access key is indicative of a mobile telephone number corresponding to the requesting client device.

This enables the server to only send postal address data to a client device corresponding to an authorised mobile telephone number.

Preferably, the method comprises the further steps of:

storing at the requesting client device a plurality of number items, each indicative of a respective mobile telephone number; and before step (b) of the fourth aspect of the invention, selecting at least one of the plurality of number items, wherein the target key is indicative of the mobile telephone number indicated by the selected number item.

By selecting a number item indicative of a mobile telephone number, it is possible to select a contact for which postal address information is desired.

Preferably, the method comprises the further step of:
storing, at the requesting client device, an indication that the mobile telephone number indicated by the selected number item, in the above step, is an authorised connection. In this way when postal address data associated with a particular contact is requested it is assumed that the requesting client is willing to share his/her postal address information with the client associated with the postal address data requested. Hence, if such a request is made the mobile telephone number indicated by the selected number item is stored as an authorised connection.

Preferably, a mobile telephone number is indicated as an authorised connection by storing an authorised connection flag in association with the number item indicative of the mobile telephone number.

Preferably, the mobile telephone number indicated by the target key corresponds with a target client device.

Preferably, the method comprises the further steps of:
before step (c) of the fourth aspect of the invention, receiving at the target client device an access request, from the server, including the access key;
identifying at the target client device whether the mobile telephone number indicated by the access key is an authorised connection of the mobile telephone number indicated by the target key; and
if the mobile telephone number indicated by the access key is an authorised connection of the mobile telephone number indicated by the target key, sending from the target client device to the server an authorised connection confirmation indicating that the mobile telephone number indicated by the access key is an authorised connection of the mobile telephone number indicated by the target key.

Hence, a client device can inform the server as to whether a particular mobile telephone number is an authorised connection. The client device may ignore access requests related to unknown mobile telephone numbers.

The method may comprise the further step of:
sending from the client device a hibernation request, to the server, including a hibernation key indicative of a mobile telephone number.

Preferably, the mobile telephone number indicated by the hibernation key corresponds with the client device sending the hibernation request.

Preferably, the method comprises the further steps of:
selecting at a client device a hibernation value, wherein the hibernation request also includes a parameter indicative of the selected hibernation value.

In this way a client device is able to set the number item indicative of the mobile telephone number corresponding to the client device into hibernation mode at the server.

Preferably, the method comprises the further steps of:
receiving at a client device a postal address information deletion request, from a server, including a deletion key indicative of a mobile telephone number; and
removing from the client device the postal address data associated with the mobile telephone number indicated by the deletion key.

In this way the server can remove postal address data from a client device when access to the data has been revoked for that client device.

Preferably, the method comprises the further step of:
sending from a client device an address update request, to the server, the address update request including an address update key indicative a mobile telephone number indicated by one of the plurality of number items stored at the server and postal address data.

Preferably, the mobile telephone number indicated by the address update key corresponds with the client device sending the address update request.

In this way a client device is able to update postal address data stored at the server in association with a number item indicative of a mobile telephone number corresponding to the client device.

Preferably, the method comprises the further steps of:
receiving, at a client device, an address confirmation request from the server;
displaying at the client device a notification confirmation of the validity of postal address data indicated by an address item stored at the server; and
sending from the client device a data package, to the server, confirming the validity of the postal address data.

In this way, the user of a client device can be prompted by the server to update postal address data.

Preferably, the method comprises the further steps of:
storing, at a client device, a plurality of number items in a primary list; and
indicating, at the client device, that at least one of the plurality number items is an authorised connection number item.

Preferably, the method comprises the further steps of:
storing, at the client device, authorised connection number items in a secondary list;
and after receiving at the client device postal address data, from the server, associated with an authorised connection number item, storing, at the client device, the authorised connection number item in a tertiary list.

The primary list of number items may be the main address book of the client device. All of the client device contacts may be stored in the main address book. The user of the client device may then decide to share his/her postal address data with a contact from the main address book. The user then selects this contact as an authorised connection and the number item is stored in the secondary list. The secondary list stores the client device authorised contacts. The server may then provide the client device with postal address information associated with the selected contact. At this point the contact would be stored in the tertiary list. The tertiary list stores the authorised connections for which postal address data has been received. This results in three lists indicating three different security levels.

Preferably, the method comprises the further steps of:
receiving input, at a client device, of a mobile telephone number;
storing in the primary list, at the client device, a number item indicative of the mobile telephone number input at the client device;
prompting, at the client device, the user to indicate whether the number item indicative of the mobile telephone number input is an authorised connection number item; and,
if the number item is an authorised connection,
storing the selected number item in the secondary list.

New mobile telephone numbers may be regularly entered into a client device. Thus, when a new mobile telephone number is entered the user is prompted as to whether the new contact is authorised connection. This avoids the user having to verify this manually.

If a number item is removed from the primary list at the client device, the method may comprise the further steps of;
- identifying, at the client device, the removed number item in the secondary list and removing it from the secondary list;
- identifying, at the client device, the removed number item in the tertiary list and removing it from the tertiary list along with any associated postal address information; and
- sending from the client device an authorised connection deletion request to the server, the authorised connection deletion request including a deletion key indicative of the removed number item.

New mobile telephone numbers may be regularly removed from a client device's main contact list/primary list. Thus, when a mobile telephone number is removed from the primary list of a first client device the first client device automatically removes the number item indicating the mobile telephone number from its secondary and tertiary list along with any associated information. This avoids the user having to manually remove the same number item from each list. When a contact is removed the postal address data related to the owner of the first client device is removed from the client device owned by the removed contact.

Preferably, the method comprises the further steps of:
sending a nudge request, from the client device to the server, including a nudge key indicative of a mobile telephone number.

Preferably, the method comprises the further steps of:
storing, at the client device, at least one address item indicative of postal address data associated with an update time stamp indicative of a period of time since the respective postal address data was last updated; and,
if the period of time indicated by the update time stamp exceeds a predetermined value,
allowing a nudge request to be sent from the client device.

In this way, a client device may only send a nudge request if the update time stamp indicates that the address data item has not been updated recently. This avoids sending unnecessary nudge requests.

The device under control of software/the method may be arranged so that a nudge request execution button is displayed in association with postal address data only if the period of time indicated by the update time stamp associated with the respective address item exceeds a predetermined value.

In this way, a client device will only display a nudge execution button if the update stamp indicates that the respective address data item has not been updated recently. This prevents a user from trying to send unnecessary nudge requests.

Preferably the method comprises the further steps of:
sending from the client device a new user request, to the server, the new user request including new user key indicative of a mobile telephone number;
receiving at the client device a text message from the server; and
sending from the client device a response to the text message, to the server.

This enables the server to confirm that the new user request is genuine.

Preferably, the method comprises the further steps of:
sending from a client device a free text update request, to a server, the free text update request including a key indicative of a mobile telephone number and supplementary information.

Preferably, the mobile telephone number indicated by the key corresponds with the client device sending the free text update request.

This enables the server to update the free text data item associated with the number item indicative of its corresponding mobile telephone number.

Preferably, the method comprises the further steps of:
selecting at the client device one of the plurality of address items stored at the client device; and
exporting postal address data indicated by the selected address item to another software element.

Thus, a postal address can be automatically passed to another application. Hence, the user is not required to manually enter the postal address data manually which can result in human error.

Preferably, the method comprises the further steps of:
receiving at the client device a postal address data update request including a key indicative of a mobile telephone number and postal address data; and
associating postal address data with the number item indicative of the mobile telephone number indicated by the key.

Thus, postal address data can be automatically updated at the client device by the server.

Preferably, postal address data is accessible via a respective identifier displayed at the client device and, in dependence on the receipt of a postal address update request, the method may include changing the appearance of the respective identifier corresponding with the postal address data indicated by the postal address data update request.

In this way, when a user is viewing postal address data items at the client device it is possible for a user to immediately recognise recently updated data items.

According to fifth aspect of the invention there is provided a computer program comprising code portions which when loaded and run on a web enabled client device cause the web enabled client device to execute any one of the methods defined above.

According to a sixth aspect of the present invention there is provided a web enabled client device arranged under the control of software to the requesting client device and comprise:
(a) a storage module arranged to store, at the requesting client device, at least one number item, wherein the number item is indicative of a mobile telephone number;
(b) a transmission module arranged to send, from the requesting client device, an address item request, to a server, the address item request including a target key indicative of the mobile telephone number indicated a number item stored at the requesting client device; and
(c) a reception module arranged to receive, at the requesting client device, a data package from the server including postal address data.

According to a seventh aspect of the present invention there is provided a method of securely providing postal address data to a requesting client device comprising the steps of:
(a) storing, at a server, a plurality of number items each associated with at least one respective address item, wherein each number item is indicative of a mobile telephone number and each address item is indicative of postal address data;
(b) sending from a requesting client device an address item request, to the server, the address item request including a target key indicative of a mobile telephone number;
(c) receiving, at the server, the address item request from the requesting client device;

(d) identifying, at the server, a respective address item associated with a number item indicative of the mobile telephone number indicated by the target key;

(e) sending from the server, to the requesting client device, a data package including at least a part of the postal address data indicated by the respective address item identified at the server; and (f) receiving at the requesting client device a data package, from the server, including the postal address data.

According to a eighth aspect of the invention there is provided a computer program comprising code portions which when loaded and run on a server and a web enabled requesting client device cause the server and the web enabled requesting client device to execute the method of the seventh aspect of the present invention.

According to an ninth aspect of the present invention there is provided a system comprising a server and a requesting client device both arranged under the control of software to respectively comprise:

(a) a server storage module arranged to store, at the server, a plurality of number items each associated with at least one respective address item, wherein each number item is indicative of a mobile telephone number and each address item is indicative of postal address data;

(b) a client transmission module arranged to send from the requesting client device an address item request, to the server, the address item request including a target key indicative of a mobile telephone number;

(c) a server reception module arranged to receive, at the server, the address item request from the requesting client device;

(d) a server identification module arranged to identify, at the server, a respective address item associated with a number item indicative of the mobile telephone number indicated by the target key;

(e) a server transmission module arranged to send from the server, to the requesting client device, a data package including at least a part of the postal address data indicated by the respective address item identified at the server; and (f) a client reception module arranged to receive at the requesting client device a data package, from the server, including the postal address data.

In other aspects of the invention there may be a computer program product comprising a physical machine readable data carrier, such as a DVD, flash memory stick or so on, carrying a computer program as defined above.

Note that in general terms and with the necessary modifications in wording, all of the further features defined above following the first and fourth aspects of the invention are applicable as further features of all of the other aspects of the invention defined above. These further features are not restated after each aspect of the invention merely for the sake of brevity.

BRIEF DESCRIPTION OF THE DRAWINGS

Embodiments of the present invention will now be described, by way of example only, with reference to the accompanying drawings, in which.

DETAILED DESCRIPTION OF THE DRAWINGS

Figure 1:
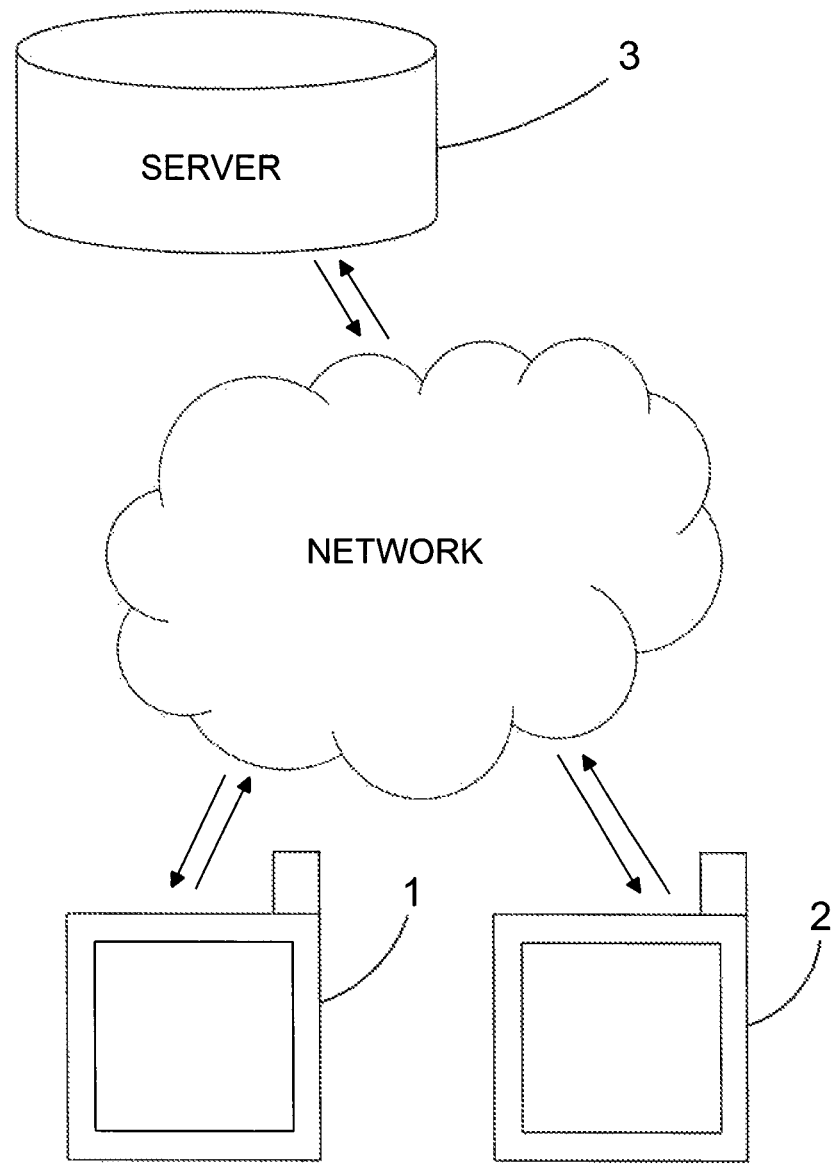
FIG. 1 schematically shows the basic general architecture used in a postal address data transfer system.

FIG. 1 schematically shows basic general architecture which can be used in a postal address data transfer system. The system may comprise any number of client devices 1, 2 and a web server 3. In this embodiment, there are two client devices 1, 2 which are both mobile telephones that are web enabled by including an embedded browser or "app" or similar. Each client device 1, 2 comprises a display, a user interface, a processor and memory. The server 3 comprises memory and a processor.

Conventionally, a user will store a plurality of mobile telephone numbers on his/her client device 1, 2. These mobile telephone numbers will relate to the contacts of the user of that client device 1, 2. The user may manually enter postal address data relating to the contacts stored on the client device 1, 2. Postal address data will be stored in association with a corresponding contact.

Then, if for instance, the user of a client device 1, 2 wishes to send an item in the post to one of his/her contacts the user may look up the postal address data relating to that contact at his/her client device 1, 2. In this situation there is no guarantee that the postal address data stored at the client device 1, 2 is correct and up to date for that particular contact. It is, therefore, possible that the user may send the item to the wrong postal address.

In order to make sure that postal address data stored at a client device 1, 2 is correct for a particular contact the user of a requesting client device 1 may choose to send a message to a target client device 2 owned by that particular contact. In response to the message, the contact may indicate that his/her postal address data stored at the requesting client device 1 is correct. Alternatively, the contact may respond indicating a new postal address. Evidently, this is an inefficient way of obtaining postal address information especially if postal address information is required for a large number of contacts at the same time.

In the embodiment of the present invention described below, the same, above described basic architecture is used. However, software is provided at the client devices 1, 2 and the server 3 to provide an improved process.

Figure 2:
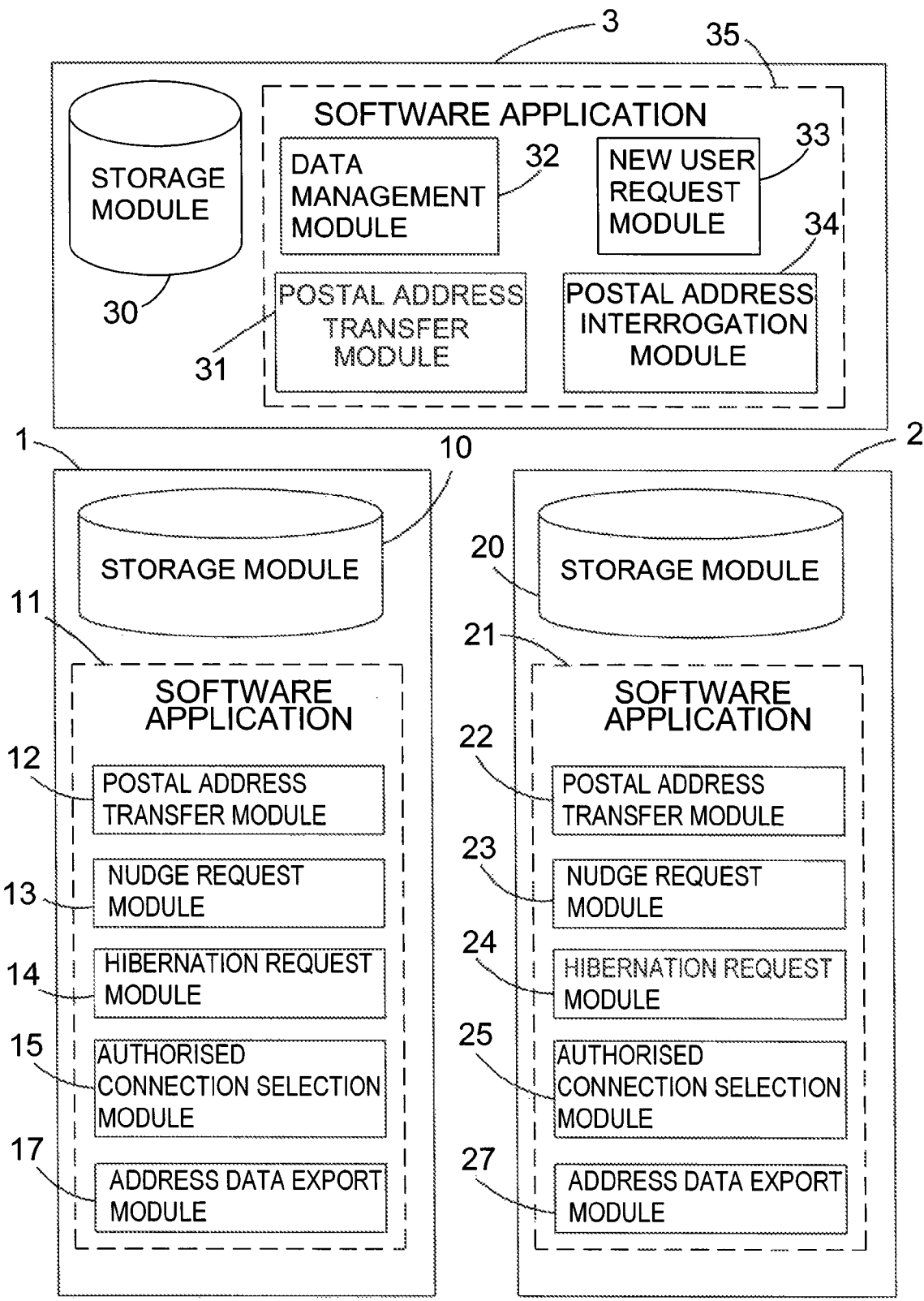
FIG. 2 schematically shows an overview of a system arranged for securely providing postal address data to a client device which embodies the present invention.

FIG. 2 schematically shows an overview of a system arranged for securely providing postal address data to a client device which embodies the present invention.

The overview of the system will now be described on the basis that all necessary software applications are pre-loaded onto the server and client devices 1, 2 and are running. The description also assumes that all of the necessary data has been pre-loaded at the server 3 and client devices 1, 2.

The requesting client device 1 comprises a storage module 10 and carries a web enabled software application 11 which when loaded and running performs various functions and can be considered to have a corresponding set of modules. Thus under the control of the software 11 the requesting client device 1 can be considered to comprise: a postal address transfer module 12, a nudge request module 13, a hibernation request module 14, an authorised connection selection module 15 and an address data export module 17.

The storage module 10 stores mobile telephone numbers which are the contacts of the owner of the requesting client device 1. There is also stored at the storage module 10 a plurality of identification tags which are, in this embodiment, names of contacts stored at the requesting client device 1. Each mobile telephone number is stored in association with a corresponding name. Each mobile telephone number is stored in association with an indication of whether that mobile telephone number is an authorised connection of the owner of the requesting client device 1. In this embodiment a mobile telephone number that is an authorised connection of the owner of the requesting client device is stored in association with an authorised connection flag.

The postal address transfer module 12 facilitates receiving postal address data, from the server 3, corresponding to contacts stored at the requesting client device 1. The nudge request module 13 enables the requesting client device 1 to send a request to the target client device 2 prompting verification of postal address data. The hibernation request module 14 enables the requesting client device 1 to notify the server 3 that the mobile telephone number corresponding to the requesting client device 1 will be inactive for a period of time. The authorised connection selection module 15 allows contacts to be selected, at the requesting client device 1, that are permitted to receive postal address data related to the owner of the requesting client device 1. The address data export module 17 enables postal address data to be exported to an external software application such as mapping software.

The target client device 2 comprises a storage module 20 and carries a web enabled software application 21 which when loaded and running performs various functions and can be considered to have a corresponding set of modules. Thus under the control of the software 21 the target client device 2 can be considered to comprise: a postal address transfer module 22, a nudge request module 23, a hibernation request module 24, an authorised connection selection module 25 and an address data export module 27. The modules at the target client device provide the same functionality to the target client device 2 as the corresponding modules do to the requesting client device 1.

The storage module 20 stores mobile telephone numbers which are the contacts of the owner of the target client device 2. Each mobile telephone number is stored in association with an indication of whether that mobile telephone number is an authorised connection of the owner of the target client device 2. In this embodiment a mobile telephone number that is an authorised connection of the owner of the target client device 2 is stored in association with an authorised connection flag.

The server 3 comprises a storage module 30 and carries a web enabled software application 35 which when loaded and running performs various functions and can be considered to have a corresponding set of modules. Thus under the control of the software application 35 the server 3 can be considered to comprise: a postal address transfer module 31, a data management module 32, a new user request module 33 and a postal address interrogation module 34.

The storage module 30 stores a plurality of number items each indicating a mobile telephone number. Each number item is associated with at least one address item. Each address item indicates postal address data. In this embodiment the number items stored at the module 30 are mobile telephone numbers and the address items are postal addresses. Each mobile telephone number is stored in association with at least one postal address, an authorised connection list and free text data item. Each authorised connection list stores a list of mobile telephone numbers that are authorised to receive postal data related to the mobile telephone number associated with that authorised connection list. Each free text data item is a character string that may provide supplementary information in relation to the corresponding postal address. This may be for example directions to the corresponding postal address.

The postal address transfer module 31 facilitates sending postal address data to client devices 1, 2. The data management module 32 carries out processes in order to ensure the integrity of the data stored at the server storage module 30. The new user request module 33 processes first-time connections to client devices 1, 2. The postal address interrogation module 34 enables the server 3 to obtain postal address data from client devices 1, 2.

A method of operation of the system shown in FIG. 2 will now be described. This method, which is described below in reference to FIG. 3, is carried out on the requesting client device 1, the target client device 2 and the server 3.

Figure 3:
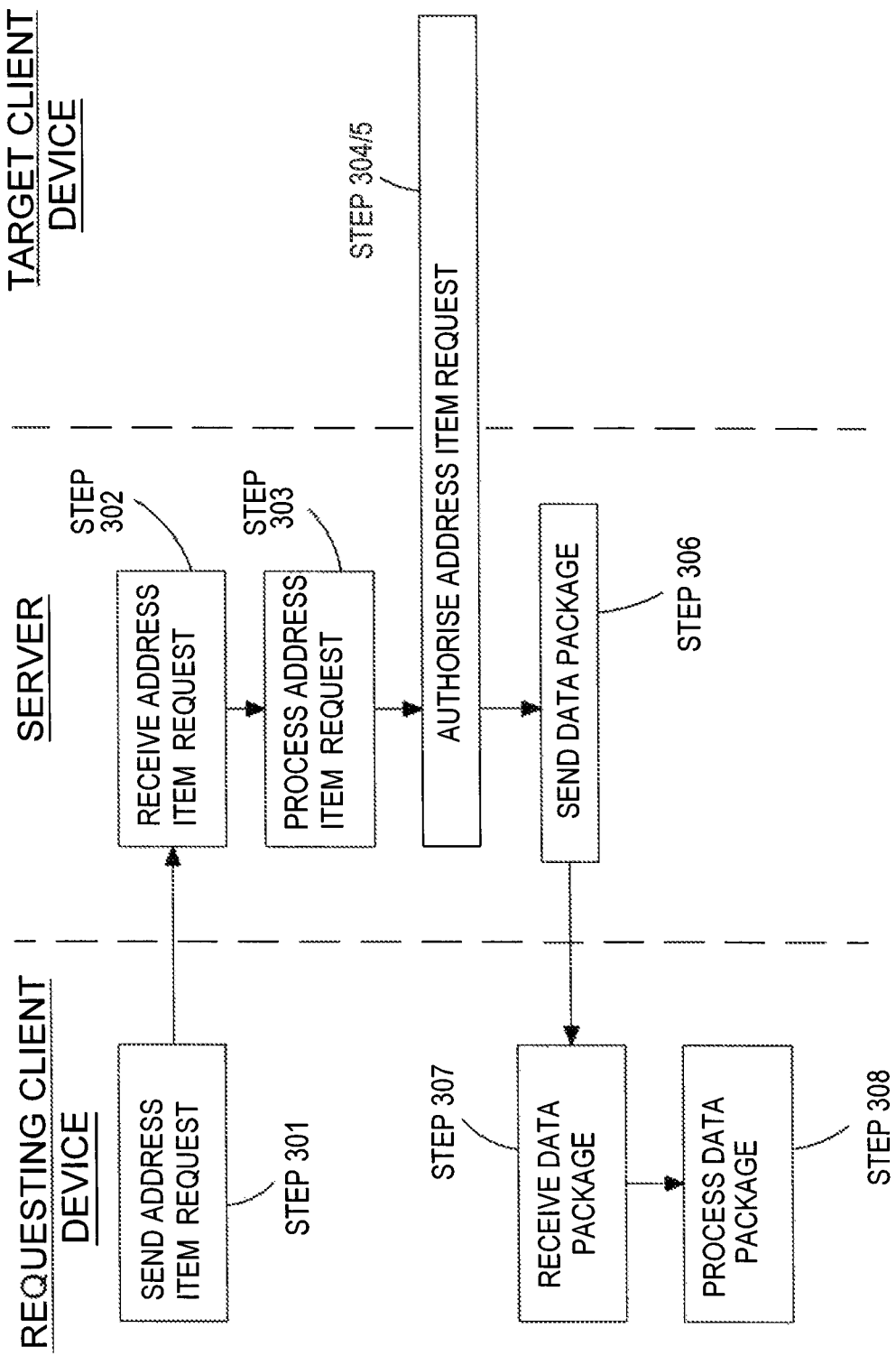
FIG. 3 shows a flow chart illustrating a method of providing postal address data to the requesting client device 1 shown in FIG. 2.

FIG. 3 shows a flow chart illustrating, at an overview level, a method of providing postal address data to the requesting client device 1 shown in FIG. 2.

In step 301 a user of the requesting client device 1 desires postal address data related to one of the contacts stored at the requesting client device 1. In order to do this the user instructs the requesting client device 1 to send an address item request to the server. The address item request includes a target key indicative of a mobile telephone number corresponding to a contact stored at the requesting client device 1. The address item request also includes an access key indicative of the mobile telephone number corresponding to the requesting client device 1. The access key can be used to authorise the address item request.

In step 302 the address item request is received at the server 3.

In step 303 the address item request is processed at the server 3. The server 3 identifies the mobile telephone number indicated by the target key. The server 3 cross-references the mobile telephone number indicated by the target key against the mobile telephone numbers stored at the server 3. The server 3 identifies a mobile telephone number stored at the server 3 corresponding to the mobile telephone number indicated by the target key. The server 3 identifies postal address data associated with the mobile telephone number identified.

In step 304/5 the server determines whether the requesting client device 1 is authorised to receive the postal address data identified in step 303. The postal address data is only sent to the requesting client device 1 if the requesting client device 1 is authorised to receive the postal address data.

Figure 4:
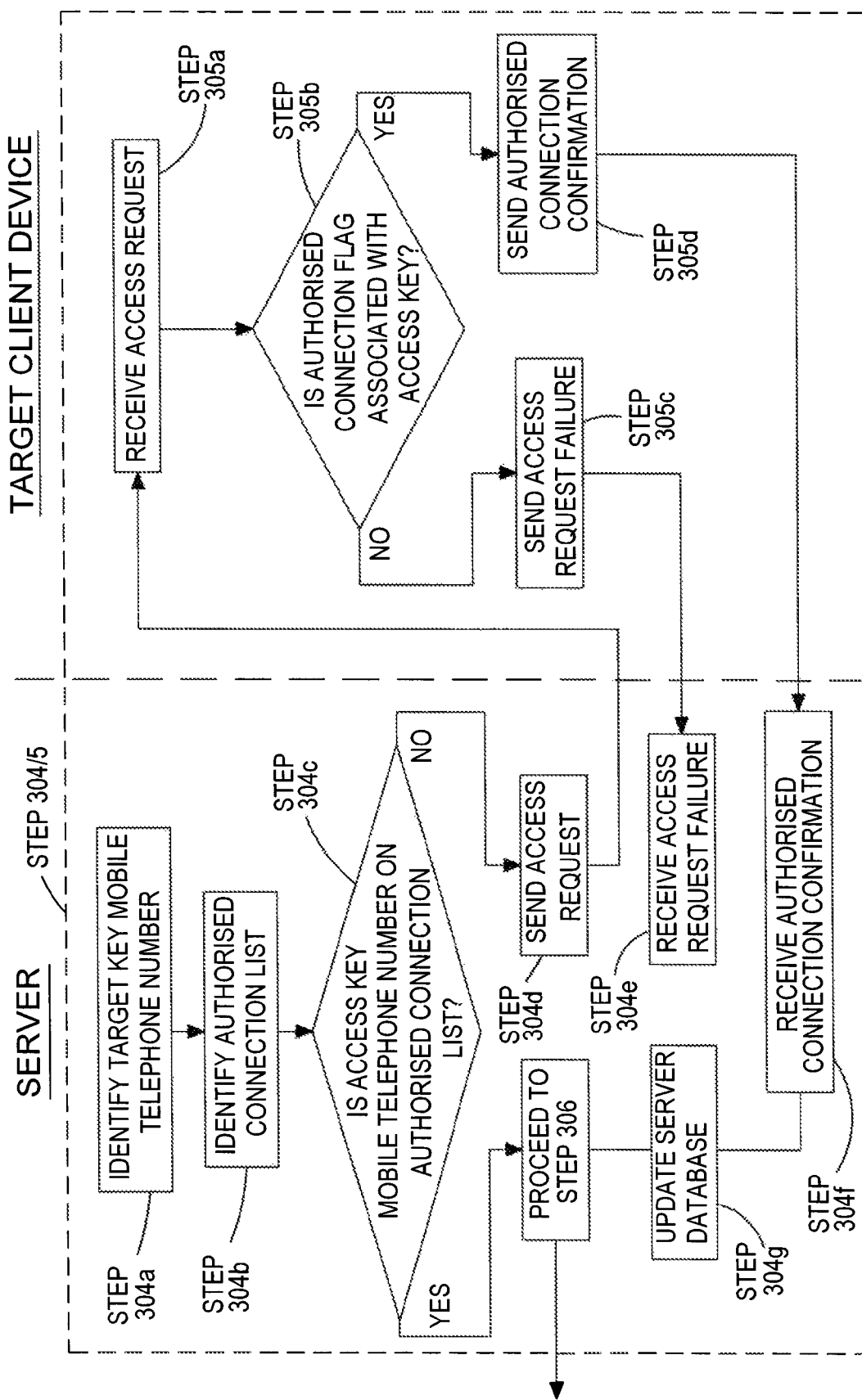
FIG. 4 shows a flow chart illustrating the sub steps of an authorization step 304/5 shown in FIG. 3.

Step 304/5 may be carried out exclusively at the server. However, in certain circumstances step 304/5 may be carried out partially at the server and partially outside of the server, in particular at the target client device. The details of step 304/5 will be described in more detail below in reference to FIG. 4.

In step 306 if the requesting client device 1 is authorised to receive the postal address data identified in step 303, the server 3 sends a data package to the requesting client device 1. The data package contains at least a part of the postal address data identified in step 303.

In step 307 the requesting client device 1 receives the data package including the postal address data identified at step 303.

In step 308 the requesting client device 1 processes the data package including the postal address data identified at step 303. The requesting client device 1 stores the received postal address in connection with the name used to identify the mobile telephone number indicated in the address item request. In this way the requesting client device 1 automatically stores postal address data in connection with an identifying label that the user of the client device uses to identify the contact corresponding with the postal address data.

It is desirable, in the interest of security that, a particular postal address data corresponding to a person is only accessible by certain people. The sub steps of the authorisation step 304/5 will now be described, with reference to FIG. 4, which facilitate this by authorising a request for postal address data on the basis of the mobile telephone number corresponding to the client device requesting the postal address data.

As previously mentioned, the address item request includes a target key indicative of a mobile telephone number corresponding to the target client device. The user of the requesting client device desires access to the postal address of the user of the target client device. The address item request also includes an access key indicative of the mobile telephone number corresponding to the requesting client device 1.

In step 304a the server identifies one of the mobile telephone numbers stored at the server which corresponds to the mobile telephone number indicated by the target key.

In step 304b the server identifies an authorised connection list associated with the mobile telephone number identified in step 304a.

In step 304c the server determines whether the mobile telephone number indicated by the access key is included in the authorised connection list identified in step 304b. If the mobile telephone number indicated by the access key is included in the authorised connection list identified in step 304b then the method proceeds to step 306 and postal address data is sent to the requesting client device.

However, if the mobile telephone number indicated by the access key is not included in the authorised connection list identified in step 304b then the method proceeds to step 304d. In step 304d an access request is sent to the target client device. The access request includes the access key indicating the mobile telephone number corresponding to the requesting client device 1.

In step 305a the target client device 2 receives the access request including the access key indicating the mobile telephone number corresponding to the requesting client device.

In step 305b the target client device 2 determines whether the mobile telephone number indicated by the access key is an authorised connection of the target client device 2. The target client device 2 determines whether a mobile telephone number corresponding with the mobile telephone number indicated by the access key is stored at the target client device 2. If no such mobile telephone number is stored at the target client device then the method proceeds to step 305c.

In step 305c the target client device sends an access request failure to the server 3.

In step 304e the access request failure is received at the server 3. The access request failure indicates to the server 3 that the requesting client device 1 is not an authorised connection of the target client device 2.

If a mobile telephone number corresponding with the mobile telephone number indicated by the access key is stored at the target client device then the target client device then determines whether that mobile telephone number is stored in association with an authorised connection flag. If the mobile telephone number is stored in association with an authorised connection flag then it is an authorised connection and the method proceeds to step 305d. If the mobile telephone number is not stored in association with an authorised connection flag then it is not an authorised connection and the method proceeds to step 305c, described above.

In step 305d the target client device sends an authorised connection confirmation to the server.

In step 304f the server receives the authorised connection confirmation. The authorised connection confirmation indicates to the server that the requesting client device is an authorised connection of the target client device.

In step 304g the server updates its database to indicate that the requesting client device is an authorised connection of the target client device. The method then proceeds to step 306 where the postal address data related to the owner of the target device is sent to the requesting client device. The postal address data is then received and processed at the requesting client device.

The method described above in reference to FIGS. 3 and 4 represents the main process of providing postal address data to a client device. Further methods are described below which represent auxiliary processes for enhancing the security and efficiency of the main process.

From time to time people change their mobile telephone numbers or move from one country to another abandoning their mobile telephone number in the previous country. In this situation a client device corresponding to a particular mobile telephone number may not establish a connection with the server for a long period of time. If this happens it may be assumed that the mobile telephone number corresponding to that client device is no longer in use. Alternatively, it may be assumed that the client device no longer wishes to access the postal address data transfer system. In either case it is advantageous to ignore processes related to such mobile telephone numbers at the server. This may avoid carrying out unnecessary processing. It may also be advantageous to remove data entries relating to out of use mobile telephone numbers in order to conserve storage space.

In some circumstances the user of a client device corresponding to a particular mobile telephone number may know in advance that a connection will not be established between the client device and the server for a long period of time. However, the user of the client device may not wish for the corresponding mobile telephone number to be deactivated or deleted at the server. In this situation the hibernation request module 14 is used to enable the user to activate hibernation mode for the corresponding mobile telephone number stored at the server.

Figure 5:
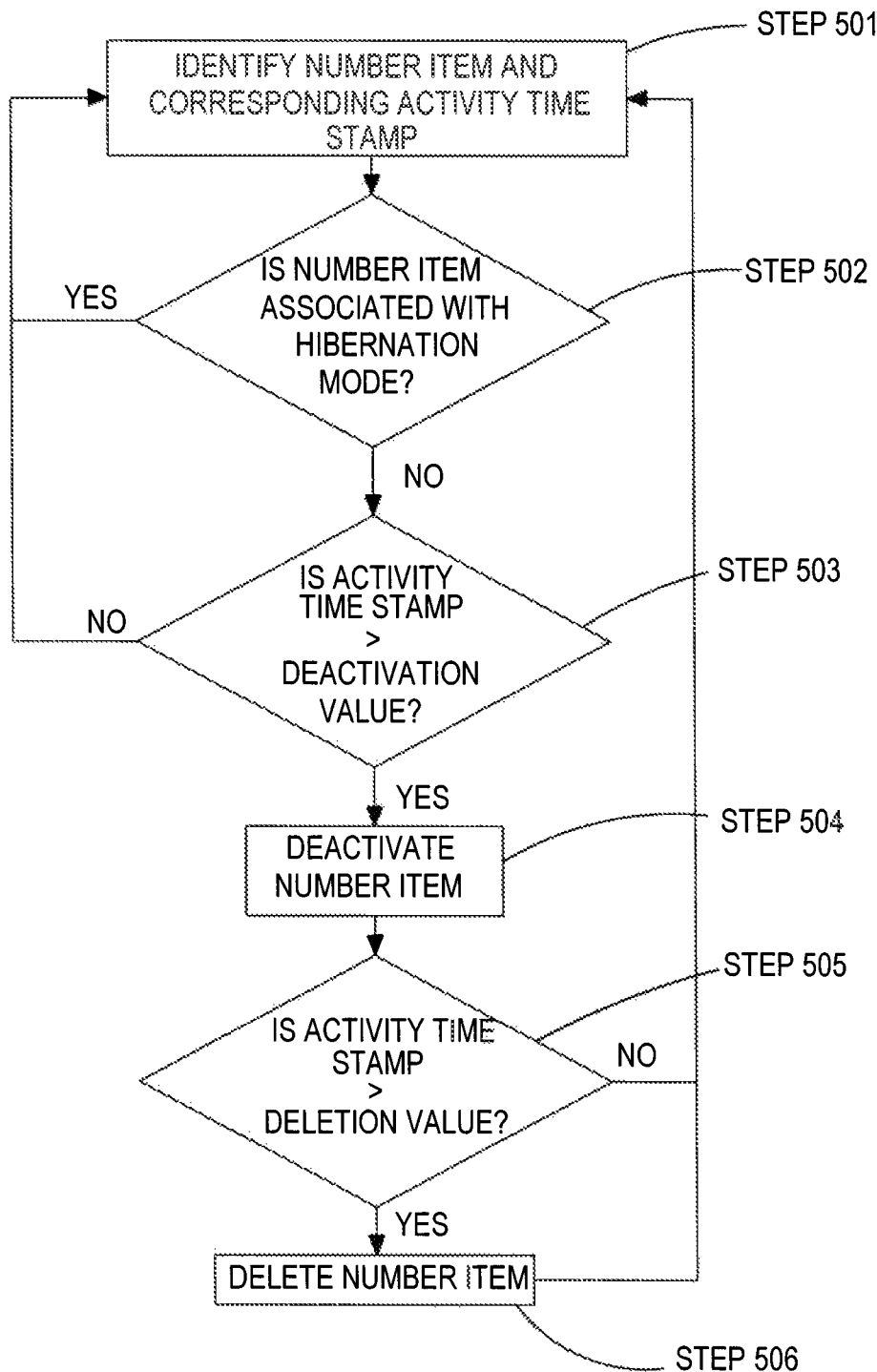
FIG. 5 shows a flow chart illustrating a method of removing data entries relating to out of use mobile telephone numbers at the server.

FIG. 5 shows a flow chart illustrating a method of removing data entries relating to out of use mobile telephone numbers at the server. The method is carried out at the server 3 using the data management module 32.

A deactivation value and a deletion value are stored at the server. The deactivation value and the deletion value indicate respective periods of time. If a client device corresponding with a mobile telephone number stored at the server has not established a connection with the server for a period of time greater than that indicated by the deactivation value then data associated with that mobile telephone number will be deactivated. If a client device corresponding with a mobile telephone number stored at the server has not established a connection with the server for a period of time greater than that indicated by the deletion value then data associated with that mobile telephone number will be deleted. The period of time indicated by the deactivation value is greater than the period of time indicated by the deletion value so that data related to a particular mobile telephone number can be deactivated before it is deleted.

Each number item indicating a respective mobile telephone number stored at the server is stored in association with an activity time stamp. Each activity time stamp is indicative of the period of time since a client device corresponding to mobile telephone number, indicated by a respective number item, last made a connection with the server.

If a client device corresponding to a mobile telephone number stored at the server makes a connection with the server then the server updates the activity time stamp associated with the mobile telephone number. In updating the activity time stamp the server sets the activity time stamp value to zero.

The following method uses the activity time stamps, the deactivation value and the deletion value in order to deactivate or delete number items at the server. The method also determines whether a particular number item is in hibernation mode and if this is the case refrains from deactivating or deleting that particular number item. This helps to avoid processing and using storage space in relation to genuinely out of use number items whilst retaining data related to number items that are actually in use.

In step 501 the server identifies one of the number items stored at the server and the activity time stamp associated with the number item identified.

In step 502 the server determines whether the number item identified in step 501 is associated with a hibernation flag. If the number item is associated with a hibernation flag then the process returns to step 501 and a different number item is identified. If the number item is not associated with a hibernation flag then the process proceeds to step 503.

In step 503 the server determines whether the period of time indicated by the activity time stamp identified in step 501 is greater than the period of time indicated by the deactivation value. If the period of time indicated by the activity time stamp is not greater than the period of time indicted by the deactivation value then the process returns to step 501 and a different number item is identified. Alternatively, if the period of time indicated by the activity time stamp is greater than the period of time indicated by the deactivation value then, the method proceeds to step 504.

In step 504 the number item identified is deactivated. Once a number item is deactivated all data packages received in relation to this number item will be ignored until the client device corresponding to a mobile telephone number indicated by the number item establishes a connection with the server. At this point the number item will be reactivated.

In step 505 the server determines whether the period of time indicated by the activity time stamp identified in step 501 is greater than the period of time indicated by the deletion value. If the period of time indicated by the activity time stamp is not greater than the period of time indicated by the deletion value then the process returns to step 501 and a different number item is identified. If the period of time indicated by the activity time stamp is greater than the period of time indicated by the deletion value then the method proceeds to step 506.

In step 506 the number item identified in step 501 is removed from the server along with any corresponding postal address data, authorised connection list and any other associated data. The process then returns to step 501 and a different number item is identified.

The following method enables the secure verification of postal address data. Conventionally, if a person wishes to send a package in the post to somebody else then they will look up the postal address of that person in their records. However, that person may have moved house and the postal address stored in the records may be out of date. Before sending the package in the post, the person sending the package may want to verify the fact that the person they are sending the package to still lives at the postal address stored in their records. It is clearly disadvantageous for that person to send individual verification messages for each postal address especially if more than one postal address needs to be verified.

Figure 6:
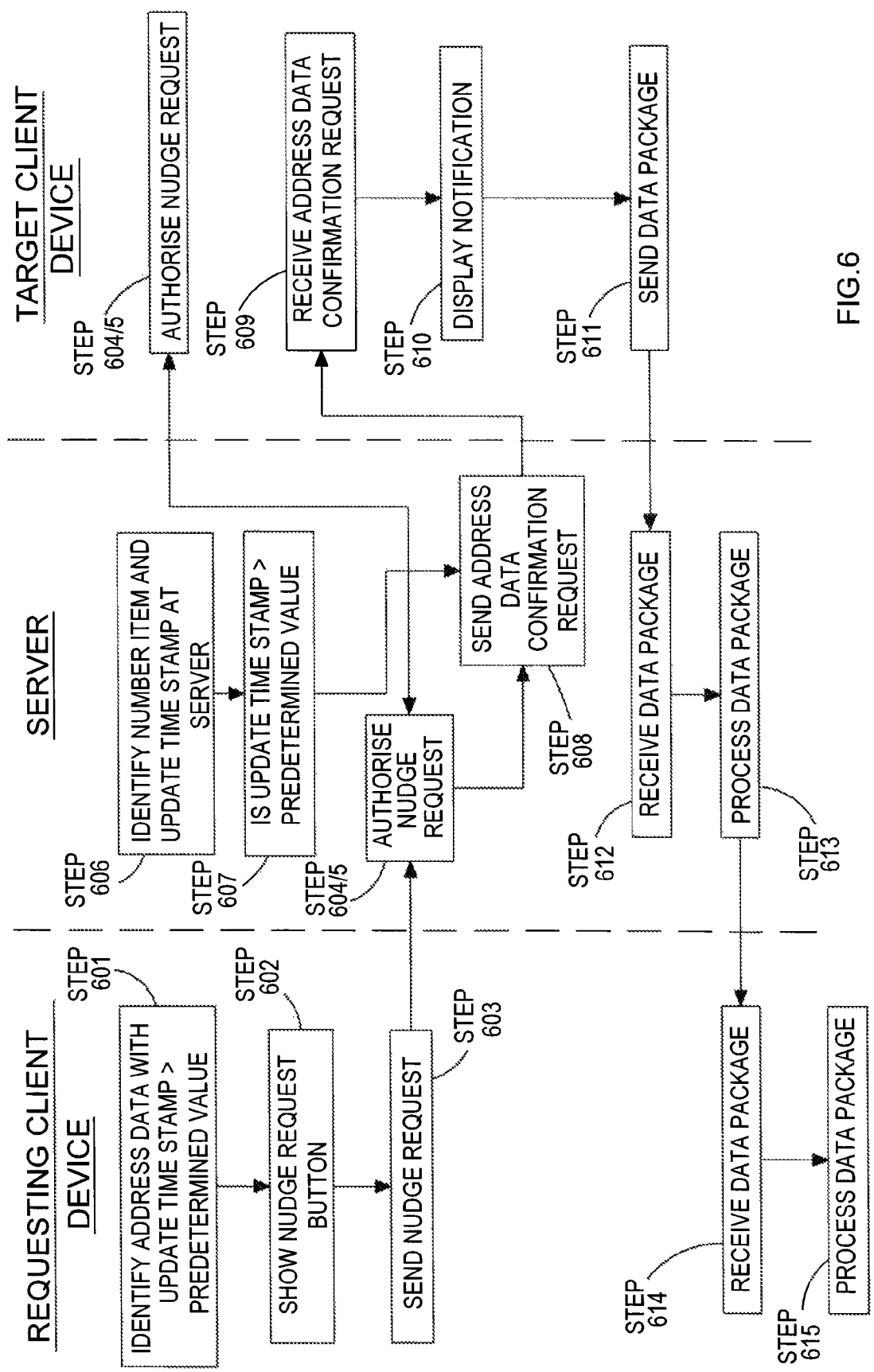
FIG. 6 shows a flow chart illustrating a method of verifying postal address data.

FIG. 6 shows a flow chart illustrating a method of verifying postal address data. The method is carried out using the software application 11 and the nudge request module 13 which is used to initiate a request for verification of postal address data at the requesting client device. The method is carried out using the software application 21 and the postal address transfer module 22 which handles requests for verification of postal address data at the target client device. The method may also be carried out using the software application 35 at the server and the data management module 34 which may be used to initiate a request for verification of postal address data at the server.

Contacts at the requesting client device are stored in association with a corresponding address item indicative of postal address data. Each address data item is stored in association with an update time stamp. Each update time stamp is indicative of the period of time since postal address data indicated by an address item associated with the update time stamp was last updated. The time period indicated by the update time stamp is provided to the requesting client device by the server. The time period indicated by an update time stamp is displayed in association with a respective contact at the requesting client device. If postal address data has not been updated in a long time this may indicate that the address data is out of date. In this situation it is advantageous for the postal address data to be verified by the contact corresponding to the postal address data.

The following method facilitates the sending of anonymous nudge requests which allows postal address data to be verified. A nudge request may be sent by a client device or by the server. A nudge request may only be sent to a particular contact if the corresponding address data is deemed to be out of date. This avoids sending an unnecessary number of nudge requests over a given period of time.

In step 601 the requesting client device identifies a contact and determines whether the time period indicated by the associated update time stamp is greater than a predetermined value. If the time period indicated by the update time stamp is less than or equal to the predetermined value the client device will assume that the address data associated with the update time stamp is up to date and the process will end.

If the time period indicated by the update time stamp is greater than the predetermined value the client device will assume that the address data associated with the update time stamp may be out of date and the method proceeds to step 602.

In step 602 a nudge request execution button is displayed at the requesting client device in association with the contact identified in step 601. Hence, the user of the client device will only be able to send a nudge request if the update time stamp is greater than the predetermined value.

In step 603 the user of the requesting client device interacts with the nudge request execution button and a nudge request is sent to the server. The nudge request contains a target key indicative of the mobile telephone number associated with the contact identified in step 601. The nudge request also includes an access key indicative of a mobile telephone number corresponding to the requesting client device.

In step 604/5 the server determines whether the nudge request is sent from an authorised connection of the client device corresponding to the mobile telephone number indicated by the target key. This process uses the techniques detailed in step 304/5 illustrated by FIGS. 3 and 4. As in step 304/5 the authorisation process may be carried out exclusively at the server or partially at the server and partially at the target client device.

In step 608 the server sends an address data confirmation request to the target client device corresponding to the mobile telephone number indicated by the target key. The address data confirmation request includes the access key indicating the mobile telephone number corresponding to the requesting client device.

In step 609 the target client device receives the address data confirmation request.

In step 610 a notification is displayed at the target client device prompting the user to indicate the validity of the postal address data stored at the requesting client device in association with the mobile telephone number indicated by the target key.

In 611 the target client device sends a data package to the server indicating the validity of the postal address data stored at the requesting client device in association with the mobile telephone number indicated by the target key. The data package may contain an indication that the postal address data is valid. Alternatively, the data package may indicate new postal address data that is valid.

In step 612 the server receives the data package indicating the validity of the postal address data.

In step 613 if the data package contains an indication that the postal address data is valid then the update time stamp associated with the postal address data will be reset to zero at the server. Alternatively, if the data package indicates new postal address data then the old postal address data will be replaced by the new postal address data. In this situation the update time stamp associated with the postal adder data will also be set to zero at the server.

In step 614 the data package is received at the requesting client device.

In step 615 if the data package contains an indication that the postal address data is valid then the update time stamp associated with the postal address data will be reset to zero at the requesting client device. Alternatively, if the data package indicates new postal address data then the old postal address data will be replaced by the new postal address data. In this situation the update time stamp associated with the postal adder data will also be set to zero at the requesting client device.

Instead of the requesting client device initiating the sending of nudge requests this may be carried out at the server.

In step 606 a number item indicating a mobile telephone number is identified at the server with an associated update time stamp.

In step 607 the server determines whether the update time stamp identified in step 606 is greater than a predetermined value. If the update time stamp identified in step 606 is greater than the predetermined value then the method proceeds to step 608 which has been described above. In this case if the server has initiated the nudge request then the data package detailed in step 613 will only be sent to authorised connections associated with the postal address related to the data package.

A method of securely providing postal address data to a client device has been described above in relation to FIG. 3 and FIG. 4. A client device may comprise a list of all of the contacts stored at the client device. This list may be called the "main contact list" of the client device. The main contact list comprises: contacts that are permitted to receive address data related to the owner of the client device, contacts that are not and contacts that have received such postal address data. A contact that is not permitted to receive address data related to the owner of the client device may be called an "unauthorised connection". A contact that is permitted to receive address data related to the owner of the client device may be called an "authorised connection".

Hence, contacts may be stored at three different security levels: unauthorised connections, authorised connections and authorised connections with access to postal address data corresponding to the owner of the client device. The following method enables the user to manage which contacts are associated with which security level. The method also enables the user to manage the security level for new contacts input into the client device.

Figure 7:
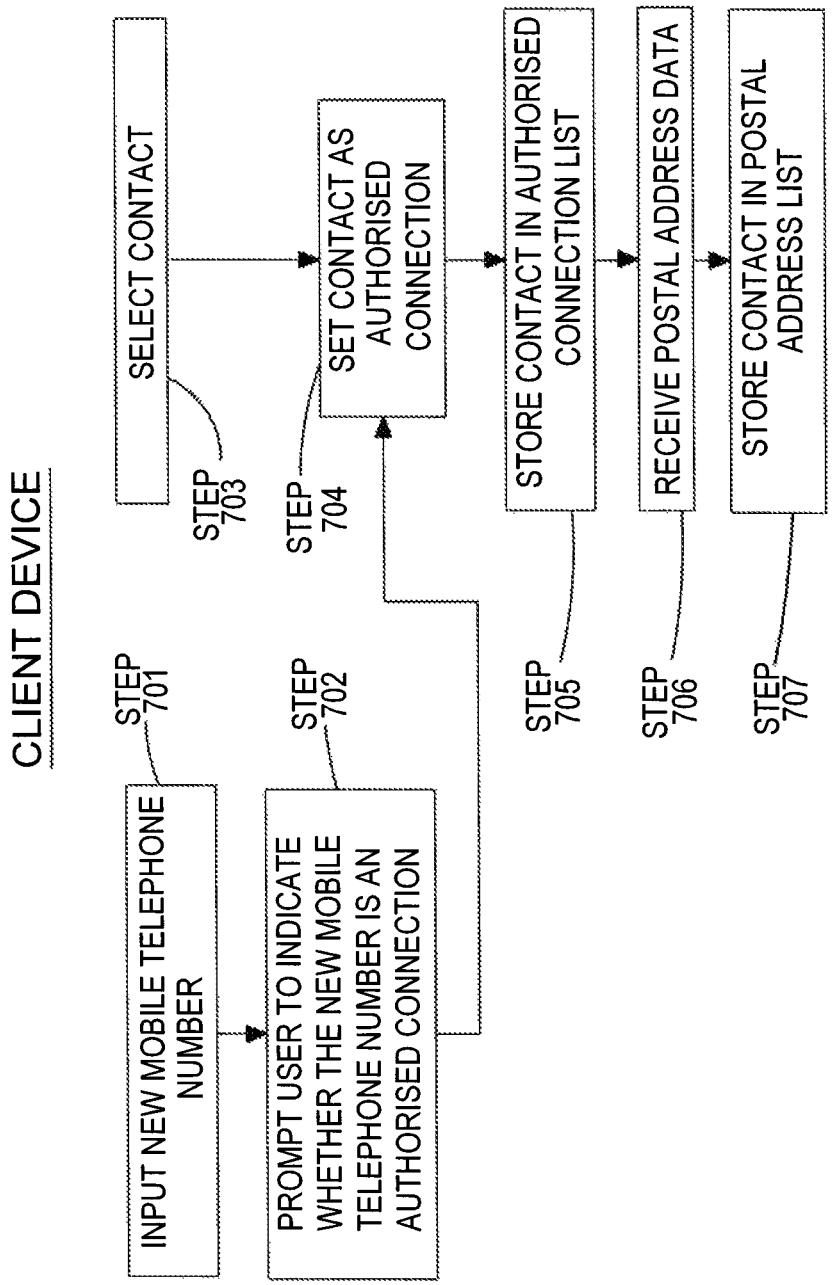
FIG. 7 shows a flow chart illustrating a method of managing contacts at the client device.

FIG. 7 shows a flow chart illustrating a method of managing contacts at the client device. The following method is carried out using the software application 11 and the authorised connection selection module 15.

In step 701a new contact is entered into the client device. In this step the user of the client device manually enters a new mobile telephone number into the client device. The user also manually enters a contact name which is then associated with the mobile telephone number at the client device. This contact is stored in the main contact list of the client device.

In step 702 the client device identifies that a new mobile telephone number has been entered. The client device then prompts the user to indicate whether the contact corresponding to the new mobile telephone number is an authorised connection.

In step 704, if the user indicates that the contact corresponding to the new mobile telephone number is an authorised connection, the client device will store an authorised connection flag in association with the contact.

In step 705 once the authorised connection flag is associated with the contact, the contact is stored in an authorised connection list. The user of the client device can view this list to determine which contact he/she has agreed to share his/her postal address information with.

In step 706 postal address data is received corresponding to one of the contacts in the authorised connection list.

In step 707 once postal address data is received corresponding to a contact that contact is stored in a postal address list along with respective postal address data. The user can view this list to determine which contacts have postal address data associated with them. The contacts in the postal address list will also have the user's postal address stored at their devices.

The user of the client device may wish to make an existing unauthorised contact an authorised contact. In step 703 the selects one such contact and the method proceeds to step 704.

The following method enables access to postal address data to be withdrawn from contacts that are no longer permitted to access such data. From time to time a user may remove a mobile telephone number, related to a contact, from the client device. In these circumstances this may indicate that the user no longer wishes to contact or be contacted by the person corresponding with the mobile telephone number removed.

Therefore, if a user removes a mobile telephone number from their client device it would be disadvantageous for the person corresponding to the removed mobile telephone number to retain postal address data related to that user.

Figure 8:
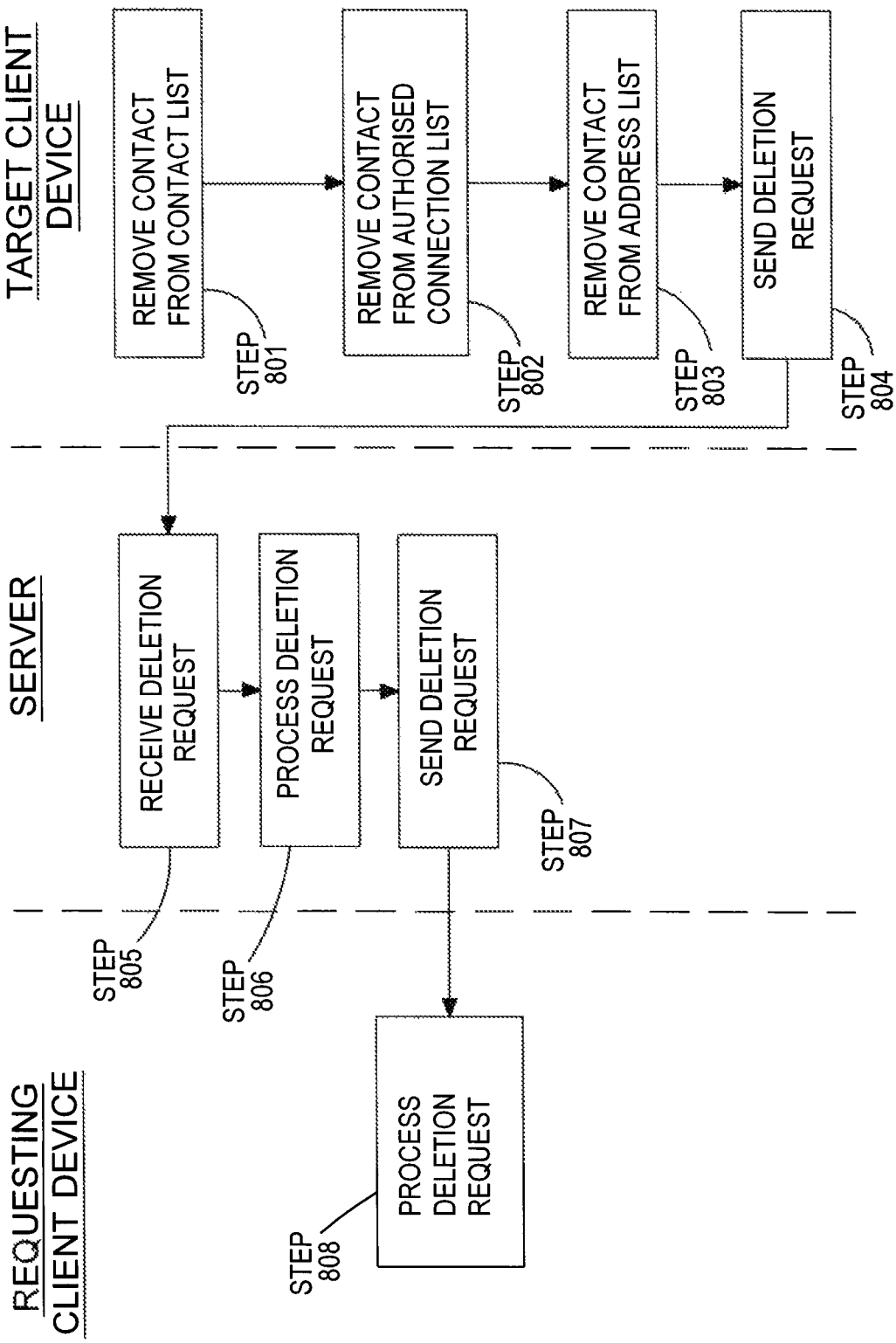
FIG. 8 shows a flow chart illustrating a method of removing a contact from a target client device and automatically removing postal address data related to the user of the target client device from a client device corresponding to the removed contact.

FIG. 8 shows a flow chart illustrating a method of removing a contact from the target client device and automatically removing postal address data related to the user of the target client device from a client device corresponding to the removed contact. The following method is carried out using the software application 11 and the authorised connection selection module 15.

In step 801 the user of the target client device removes a contact from the main contact list.

In step 802 the target client device determines whether the contact removed from the main contact list is stored in the authorised connection list. If the contact removed from the main contact list is stored in the authorised connection list, then the target client device removes the contact from the authorised connection list. The target client device also removes the authorised connection flag associated with the contact.

In step 803 the target client device determines whether the contact removed from the main contact list is stored at the postal address list. If the contact removed from the main contact list is stored at the postal address list, then the target client device removes the contact from the postal address list. The target client device also removes postal address data and any other data associated with the contact from the target client device.

In step 804 the target client device sends a deletion request to the server. The deletion request includes a deletion key indicating the mobile telephone number corresponding to the target device and the mobile telephone number corresponding to the removed contact.

In step 805 the server receives the deletion request.

In step 806 the server identifies the number item indicative of the mobile telephone number corresponding to the target client device and the number item indicative of the mobile telephone number corresponding to the removed contact. The server removes the number item indicative of the mobile telephone number associated with the removed contact from the authorised connection list associated with the mobile telephone number corresponding to the target device. The server also removes the number item indicative of the mobile telephone number associated with the target device from the authorised connection list associated with the mobile telephone number corresponding to the removed contact.

In step 807 the server sends a deletion request to the client device corresponding to the removed contact which in this embodiment is the requesting client device. The deletion request includes the mobile telephone number corresponding to the target client device.

In step 808 the requesting client device receives the deletion request and removes any postal address data and associated information stored at the requesting client device corresponding to the mobile telephone number of the target client device.

The following method enables the server to authenticate new users. A client device corresponding to a mobile telephone number that is not stored at the server may contact the server. In this situation it is advantageous for such new user requests to be authenticated in order to avoid receiving fraudulent address item requests.

Figure 9:
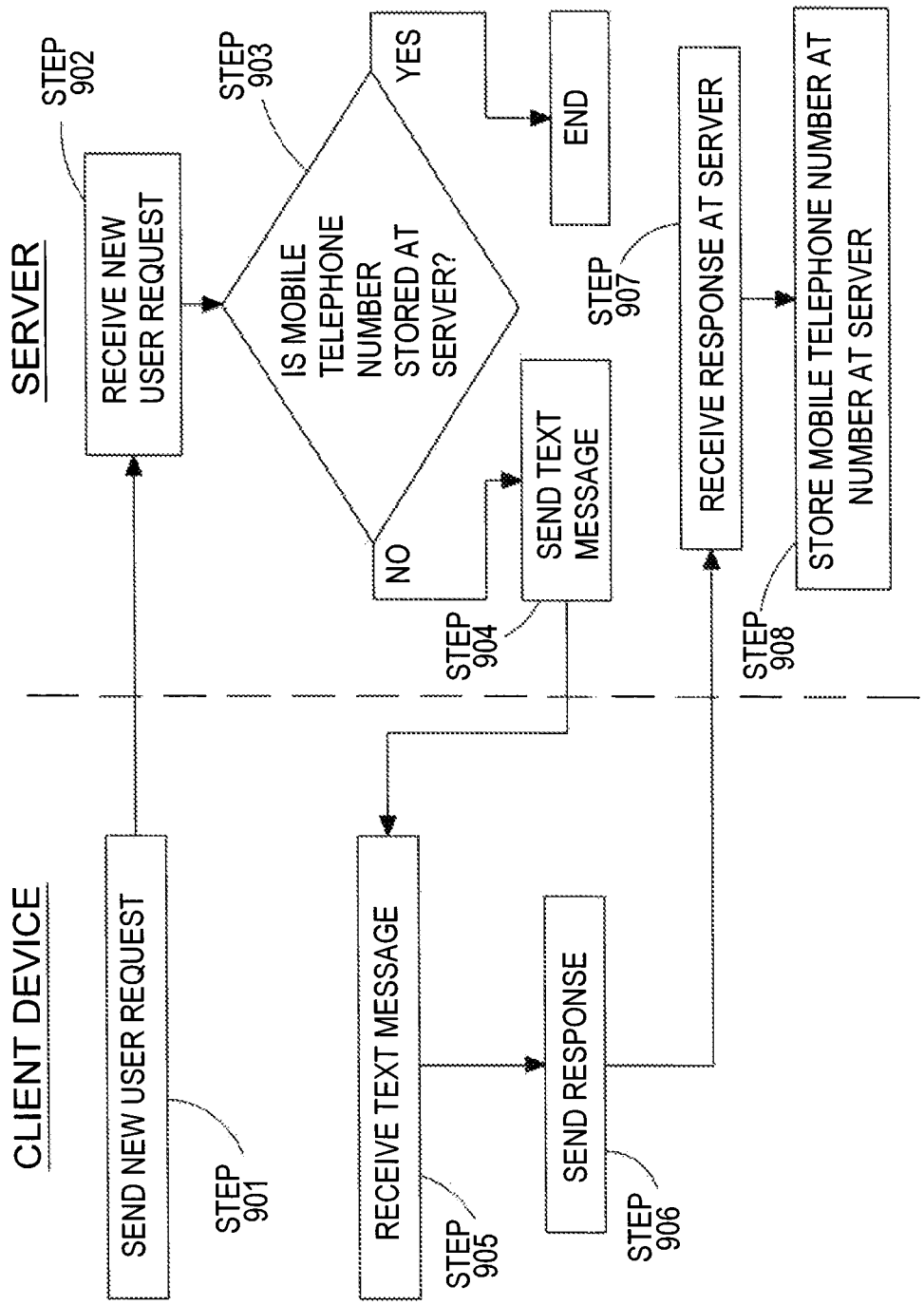
FIG. 9 shows a flow chart illustrating a method of processing new user requests.

FIG. 9 shows a flow chart illustrating a method of processing new user requests. The following method is carried out using the new user request module 33.

In step 901a new user request is sent from a client device. The new user request indicates a mobile telephone number corresponding to the client device sending the new user request.

In step 902 the new user request is received by the server.

In step 903 the server determines whether the mobile telephone number indicated by the new user request is stored at the server. If the mobile telephone number is stored at the server then the process ends. If the mobile telephone number is not stored at the server then the method proceeds to step 904.

In step 904 the server sends a text message to the client device.

In step 905 the server receives the text message.

In step 906 the client device sends a response to the text message back to the server. The response to the text message indicates that the new user request from step 901 is genuine.

In step 907 the response to the text message is received at the server.

In step 908, if the response to the text message indicates that the new user request from step 901 is genuine, a number item indicative of the mobile telephone number corresponding to the client device is stored at the server. The client device may then upload postal address data to the server that will be stored in association with the number item.

The method of providing postal address data to client devices described above assumes that postal address data corresponding to a mobile telephone number indicated by an address item request is already stored at the server. However, this may not always be the case. The following method enables the server to acquire postal address information that is not already stored at the server.

In the following method the server enables a text message to be sent to a client device prompting the user of a client device to provide postal address information to the server. The method enables the server to instruct a client device to send a group of these prompting text messages to other client devices. This avoids the server having to send these text messages which may require a large amount of processing if multiple groups of prompting text messages were required to be sent simultaneously.

It may be disadvantageous for one particular client device to receive a large number of prompting text messages over a given period of time. Therefore, the server stores the number of prompting text messages that have been sent to a particular mobile telephone number over a given period of time. Alternatively, the server stores the total number of text messages that have been sent to a particular mobile telephone number.

Figure 10:
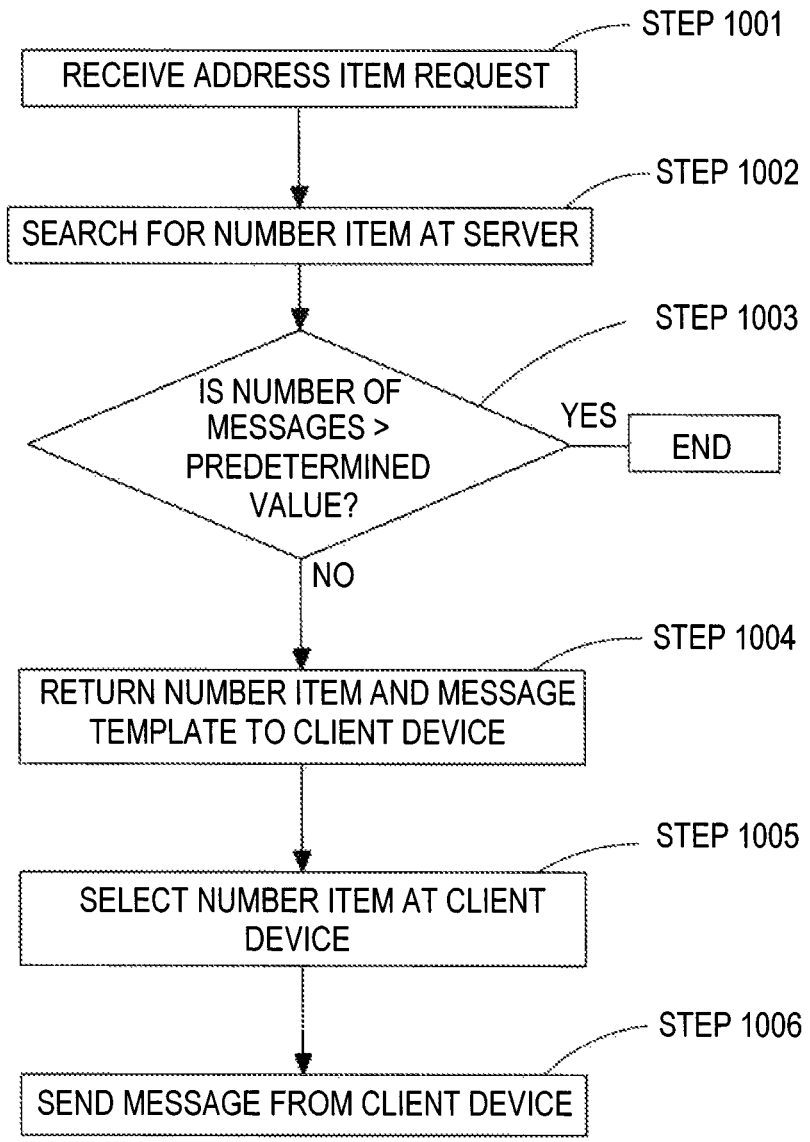
FIG. 10 shows a flow chart illustrating a method of interrogating client devices for postal address data not stored at the server.

FIG. 10 shows a flow chart illustrating a method of interrogating client devices for postal address data not stored at the server. The following method is carried out by the software application 35 at the server 3 using the postal address interrogation module 34.

In step 1001 an address item request is sent from a client device and received at the server. As previously described the address item request includes a target key indicative of a mobile telephone number.

In step 1002 the server searches for a number item indicative of the mobile telephone number indicated by the target key stored at the server. If a number item indicative of the mobile telephone number indicated by the target key is not stored at the server, the method proceeds to step 1003.

In step 1003 the server determines whether the number of text messages sent to the mobile telephone number indicated by the target key is greater than a predetermined value. If the number of text messages sent to the mobile telephone number indicated by the target key is greater than a predetermined value then the process ends. This prevents further text messages being sent to the mobile telephone number indicated by the target key.

However, if the number of text messages sent to the mobile telephone number indicated by the target key is not greater than a predetermined value then the method proceeds to step 1004.

In step 1004 the server returns the number item indicative of the mobile telephone number indicated by the target key and a message template to the client device. The message template indicates instructions for uploading postal address data to the server.

In step 1005 the mobile telephone number indicated by the target key is selected by the user at the client device. If the mobile telephone number is selected the method proceeds to step 1006.

In step 1006 the message template is sent to the mobile telephone number indicated by the target key.

When the client device corresponding to the mobile telephone number item indicated by the target key receives the message template the user of that client device may upload his/her postal address data to the server. The client device sending the address item request in step 1001 may now be able to access postal address information corresponding to mobile telephone number indicated by the target key.

The above method may be carried out in relation to a plurality of mobile telephone numbers. The client device may send a plurality of address item requests in step 1001 and in step 1004 the server may return a plurality of number items. In step 1005 the user may select at least one of the plurality of mobile telephone numbers. Then in step 1006 the client device may only send a message to mobile telephone numbers indicated by number items selected by the user.

The present embodiments of the invention may be embodied in various different forms for example: a method, a computer (i.e. web enabled device or server) arranged under the control of software, a computer program, a computer program stored on a machine readable record carrier such as a disk (hard disc, CD-ROM, DVD-ROM or so on) or memory module, or as carried on a signal.

The invention claimed is:

1. A method of securely providing postal address data to a client device comprising the steps of:
    (a) storing, at a server, a plurality of number items each associated with at least one respective address item, wherein each number item is indicative of a mobile telephone number and each address item is indicative of postal address data;
    (b) receiving, at the server, an address item request, from a requesting client device, the address item request including a target key indicative of a mobile telephone number, and the address item request including an access key indicative of another mobile telephone number, which number corresponds to the requesting client device;
    (c) identifying, at the server, a respective address item associated with a number item indicative of the mobile telephone number indicated by the target key; and
    (d) sending from the server, to the requesting client device, a data package including at least a part of the postal address data indicated by the respective address item identified at the server;
    storing, at the server, an indication that at least one mobile telephone number is an authorized connection of another mobile telephone number;
    before step (d), determining at the server whether the mobile telephone number indicated by the access key is an authorized connection of the mobile telephone number indicated by the target key;
    carrying out step (d), only if the mobile telephone number indicated by the access key is an authorized connection of the mobile telephone number indicated by the target key, the mobile telephone number indicated by the target key corresponding to a target client device, and
    the step of determining at the server whether the mobile telephone number indicated by the access key is an authorized connection of the mobile telephone number indicated by the target key comprising the steps of:
        sending from the server, to the target client device, an access request including the access key; and,
        receiving at the server, from the target client device, an authorized connection confirmation indicating that the mobile telephone number indicated by the access key is an authorized connection of the mobile telephone number indicated by the target key.

2. A method according to claim 1 in which each of the plurality of number items is associated with an authorized connection list indicative of at least one other mobile telephone number, wherein a mobile telephone number indicated by an authorized connection list is an authorized connection of the mobile telephone number indicated by the number item associated with the authorized connection list.

3. A method according to claim 2 in which each of the plurality of number items is associated with a respective unique identification code and each authorized connection list is indicative of at least one unique identification code.

4. A method according to claim 1 in which the method comprises the further step of:
    after receiving the authorized connection confirmation, storing at the server an indication that the mobile telephone number indicated by the access key is an authorized connection of the mobile telephone number indicated by the target key.

5. A method according to claim 1 in which the method comprises the further step of:
    after the step of receiving the authorized connection confirmation, storing at the server an indication that the mobile telephone number indicated by the target key is an authorized connection of the number item indicated by the access key.

6. A method according to claim 1 wherein after the step of determining at the server whether the mobile telephone number indicated by the access key is an authorized connection of the mobile telephone number indicated by the target key, the method comprises the further step of:
    identifying at the server whether the mobile telephone number indicated by the target key is an authorized connection of the mobile telephone number indicated by the access key; and,
    carrying out step (d) of the first aspect of the invention, only if the mobile telephone number indicated by the access key is an authorized connection of the mobile telephone number indicated by the target key and the mobile telephone number indicated by the target key is an authorized connection of the mobile telephone number indicated by the access key.

7. A method according to claim 1 in which each of the plurality of number items stored at the server are associated with an activity time stamp indicative of a period of time since the last connection was made between the server and a client device corresponding to a mobile telephone number indicated by a respective number item, and the method comprises the further steps of:
storing, at the server, a predetermined de-activation value indicative of a period of time;
identifying at the server a number item associated with an activity time stamp indicative of a period of time greater than the period of time indicated by the de-activation value; and,
de-activating at the server the number item identified and other data associated with it.

8. A method according to claim 7 in which the method comprises the further step of:
storing, at the server, a predetermined deletion value indicative of a period of time;
identifying at the server a number item associated with an activity time stamp indicative of a period of time greater than the period of time indicated by the deletion value; and,
deleting at the server the number item identified and other data associated with it.

9. A method according to claim 1 in which the method comprises the further steps of:
receiving at the server a hibernation request, from a client device, including a key indicative of a mobile telephone number; and
associating at the server a hibernation flag with a number item indicative of the mobile telephone number indicated by the key.

10. A method according to claim 1 in which the method comprises the further steps of;
identifying, at the server, one of the plurality of number items;
determining, at the server, whether the number item identified is associated with a hibernation flag; and if the number item identified is associated with a hibernation flag,
preventing, at the server, the number item identified and its other associated items from being one of de-activated and deleted.

11. A method according to claim 1, in which the method may comprise the further steps of:
receiving at the server, from a first client device, a nudge request including a nudge key indicative of a mobile telephone number;
sending a postal address data confirmation request from the server, to a second client device corresponding to the mobile telephone number indicated by the nudge key; and
receiving from the second client device a data package indicative of the validity of the postal address data associated with the mobile telephone number indicated by the nudge key.

12. A method according to claim 11 in which, the nudge request also includes an access key and the method comprises, before the step of sending a postal address data confirmation request from the server to a second client device corresponding to the mobile telephone number indicated by the nudge key, the further steps of:
identifying at the server whether the mobile telephone number corresponding to the first client device is indicated as an authorized connection of the mobile telephone number indicated by the nudge key; and,
only if the mobile telephone number corresponding to the first client device is an authorized connection of the mobile telephone number indicated by the nudge key, carrying out the steps of:
sending a postal address data confirmation request from the server, to a second client device; and receiving from the second client device an address update request indicative of the validity of the postal address data associated with the number item indicated by the nudge key.

13. A method according to claim 1 in which the method comprises the further steps of:
receiving at the server a new user request, from a client device, the new user request including a new user key indicative of a mobile telephone number;
identifying at the server whether a number item indicative of the mobile telephone number indicated by the new user key is stored at the server; and,
if a number item indicative of the mobile telephone number indicated by the new user key is not stored at the server:
sending from the server a text message to a client device corresponding to the mobile telephone number data indicated by the new user key;
receiving a response from the client device corresponding to the mobile telephone number indicated by the new user key; and
storing, at the server, a number item indicative of the mobile telephone number indicated by the new user key.

14. A computer program product comprising a non-transitory computer readable storage medium carrying an executable computer program comprising code portions which when loaded and run on a computer cause the computer to operate as a server in executing a method of securely providing postal address data to a client device comprising the steps of:
(a) storing, at the server, a plurality of number items each associated with at least one respective address item, wherein each number item is indicative of a mobile telephone number and each address item is indicative of postal address data;
(b) receiving, at the server, an address item request, from a requesting client device, the address item request including a target key indicative of a mobile telephone number, and the address item request including an access key indicative of another mobile telephone number, which number corresponds to the requesting client device;
(c) identifying, at the server, a respective address item associated with a number item indicative of the mobile telephone number indicated by the target key; and
(d) sending from the server, to the requesting client device, a data package including at least a part of the postal address data indicated by the respective address item identified at the server;
storing, at the server, an indication that at least one mobile telephone number is an authorized connection of another mobile telephone number;
before step (d), determining at the server whether the mobile telephone number indicated by the access key is an authorized connection of the mobile telephone number indicated by the target key;
carrying out step (d), only if the mobile telephone number indicated by the access key is an authorized connection of the mobile telephone number indicated by the target key, the mobile telephone number indicated by the target key corresponding to a target client device, and
the step of determining at the server whether the mobile telephone number indicated by the access key is an authorized connection of the mobile telephone number indicated by the target key comprising the steps of:
sending from the server, to the target client device, an access request including the access key; and,
receiving at the server, from the target client device, an authorized connection confirmation indicating that the mobile telephone number indicated by the access key is an authorized connection of the mobile telephone number indicated by the target key.

15. A server arranged under the control of software to comprise:
(a) a storage module arranged to store, at the server, a plurality of number items each associated with at least one respective address item, wherein each number item is indicative of a mobile telephone number and each address item is indicative of postal address data;
(b) a reception module arranged to receive, at the server, an address item request from a requesting client device the address item request including a target key indicative of a mobile telephone number, and the address item request including an access key indicative of another mobile telephone number, which number corresponds to the requesting client device;
(c) an identification module arranged to identify, at the server, a respective address item associated with a number item indicative of the mobile telephone number indicated by the target key; and
(d) a transmission module arranged to send from the server, to the requesting client device, a data package including at least a part of the postal address data indicated by the respective address item identified at the server,
the storage module arranged to store, at the server, an indication that at least one mobile telephone number is an authorized connection of another mobile telephone number;
before step (d), the reception module and the transmission module arranged to determine at the server whether the mobile telephone number indicated by the access key is an authorized connection of the mobile telephone number indicated by the target key;
the transmission module arranged to carry out step (d), only if the mobile telephone number indicated by the access key is an authorized connection of the mobile telephone number indicated by the target key, the mobile telephone number indicated by the target key corresponding to a target client device, and
the reception module and the transmission module arranged to determine whether the mobile telephone number indicated by the access key is an authorized connection of the mobile telephone number indicated by the target key by:
the transmission module sending from the server, to the target client device, an access request including the access key; and
the reception module receiving at the server, from the target client device, an authorized connection confirmation indicating that the mobile telephone number indicated by the access key is an authorized connection of the mobile telephone number indicated by the target key.

16. A method of securely providing postal address data to a requesting client device comprising the steps of:
(a) storing, at a server, a plurality of number items each associated with at least one respective address item, wherein each number item is indicative of a mobile telephone number and each address item is indicative of postal address data;
(b) sending from a requesting client device an address item request, to the server, the address item request including a target key indicative of a mobile telephone number, and the address item request including an access key indicative of another mobile telephone number, which number corresponds to the requesting client device;
(c) receiving, at the server, the address item request from the requesting client device;
(d) identifying, at the server, a respective address item associated with a number item indicative of the mobile telephone number indicated by the target key;
(e) sending from the server, to the requesting client device, a data package including at least a part of the postal address data indicated by the respective address item identified at the server; and
(f) receiving at the requesting client device a data package, from the server, including the postal address data;
storing, at the server, an indication that at least one mobile telephone number is an authorized connection of another mobile telephone number;
before step (e) and (f), determining at the server whether the mobile telephone number indicated by the access key is an authorized connection of the mobile telephone number indicated by the target key;
carrying out step (e) and (f), only if the mobile telephone number indicated by the access key is an authorized connection of the mobile telephone number indicated by the target key, the mobile telephone number indicated by the target key corresponding to a target client device, and
the step of determining at the server whether the mobile telephone number indicated by the access key is an authorized connection of the mobile telephone number indicated by the target key comprising the steps of:
sending from the server, to the target client device, an access request including the access key; and,
receiving at the server, from the target client device, an authorized connection confirmation indicating that the mobile telephone number indicated by the access key is an authorized connection of the mobile telephone number indicated by the target key.

17. A system comprising a server and a requesting client device both arranged under the control of software to respectively comprise:
(a) a server storage module arranged to store, at the server, a plurality of number items each associated with at least one respective address item, wherein each number item is indicative of a mobile telephone number and each address item is indicative of postal address data;
(b) a client transmission module arranged to send from the requesting client device an address item request, to the server, the address item request including a target key indicative of a mobile telephone number, and the address item request including an access key indicative of another mobile telephone number, which number corresponds to the requesting client device;
(c) a server reception module arranged to receive, at the server, the address item request from the requesting client device;
(d) a server identification module arranged to identify, at the server, a respective address item associated with a number item indicative of the mobile telephone number indicated by the target key;
(e) a server transmission module arranged to send from the server, to the requesting client device, a data package including at least a part of the postal address data indicated by the respective address item identified at the server; and
(f) a client reception module arranged to receive at the requesting client device a data package, from the server, including the postal address data' the storage module arranged to store, at the server, an indication that at least one mobile telephone number is an authorized connection of another mobile telephone number;

before step (e) and (f), the reception module and the transmission module arranged to determine at the server whether the mobile telephone number indicated by the access key is an authorized connection of the mobile telephone number indicated by the target key;

the transmission module arranged to carry out step (e) and (f), only if the mobile telephone number indicated by the access key is an authorized connection of the mobile telephone number indicated by the target key, the mobile telephone number indicated by the target key corresponding to a target client device, and the reception module and the transmission module arranged to determine whether the mobile telephone number indicated by the access key is an authorized connection of the mobile telephone number indicated by the target key by:

the transmission module sending from the server, to the target client device, an access request including the access key; and the reception module receiving at the server, from the target client device, an authorized connection confirmation indicating that the mobile telephone number indicated by the access key is an authorized connection of the mobile telephone number indicated by the target key.

* * * * *